(12) United States Patent
Abe et al.

(10) Patent No.: US 10,244,173 B2
(45) Date of Patent: Mar. 26, 2019

(54) DRIVING DEVICE PROVIDED IN IMAGE STABILIZER, CONTROL METHOD THEREFOR, AND IMAGE PICKUP APPARATUS

(71) Applicant: CANON KABUSHIKI KAISHA, Tokyo (JP)

(72) Inventors: Ryo Abe, Tokyo (JP); Mitsuhiro Izumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 15/433,559

(22) Filed: Feb. 15, 2017

(65) Prior Publication Data
US 2017/0244899 A1 Aug. 24, 2017

(30) Foreign Application Priority Data
Feb. 19, 2016 (JP) ................................. 2016-029933

(51) Int. Cl.
*H04N 5/232* (2006.01)
*H04N 5/225* (2006.01)

(52) U.S. Cl.
CPC ....... *H04N 5/23287* (2013.01); *H04N 5/2254* (2013.01); *H04N 5/23258* (2013.01)

(58) Field of Classification Search
CPC ........... H04N 5/23287; H04N 5/23258; H04N 5/2254

USPC ............... 348/335, 340, 345, 348, 350, 352, 348/208.1–208.8
See application file for complete search history.

(56) References Cited

U.S. PATENT DOCUMENTS

2015/0350507 A1* 12/2015 Topliss ................ H04N 5/2254
348/208.2

FOREIGN PATENT DOCUMENTS

JP 2000-019577 A 1/2000

* cited by examiner

*Primary Examiner* — Yogesh K Aggarwal
(74) *Attorney, Agent, or Firm* — Carter, DeLuca & Farrell, LLP

(57) ABSTRACT

A driving device that is capable of suppressing enlargement of diameter when a movable amount of a moving part increases. The driving device drives a moving part that is movably supported by a fixing part in a predetermined direction. A drive unit has first and second actuators each of which includes a coil arranged in one of the fixing part and moving part and a magnet arranged in the other part so as to face the coil, and gives a thrust to drive the moving part. A control unit controls the drive unit by controlling electric currents supplied to the coils of the first and second actuators in response to results obtained by multiplying first and second coefficients that vary in response to the position of the moving part to first and second control values obtained from first and second functions based on the position of the moving part, respectively.

17 Claims, 25 Drawing Sheets

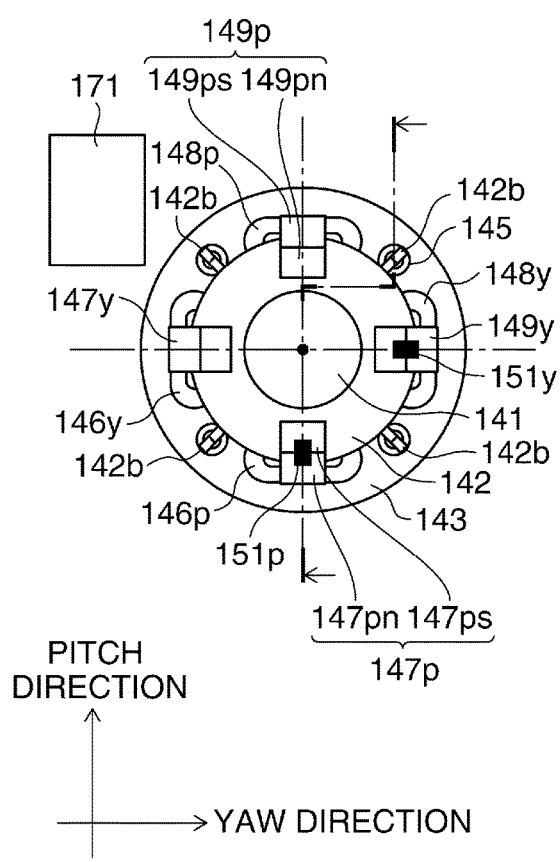
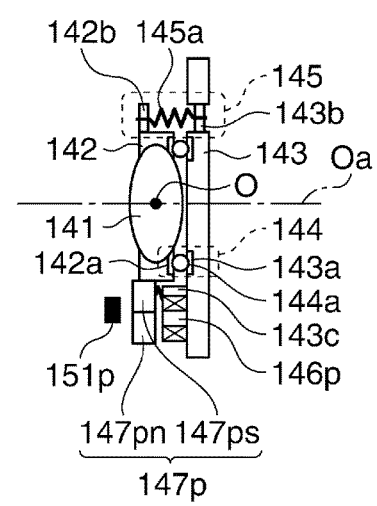
FIG. 2A
FIG. 2B
PITCH DIRECTION
→ YAW DIRECTION

PITCH DIRECTION
→ YAW DIRECTION

PITCH
DIRECTION
↑
→ YAW DIRECTION

PITCH DIRECTION ↑
→ YAW DIRECTION

*FIG. 10A* *FIG. 10B*
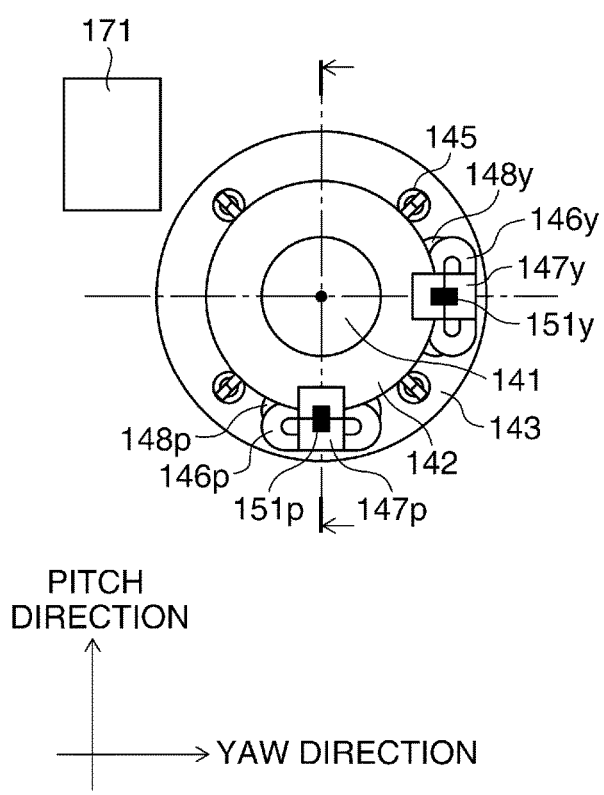
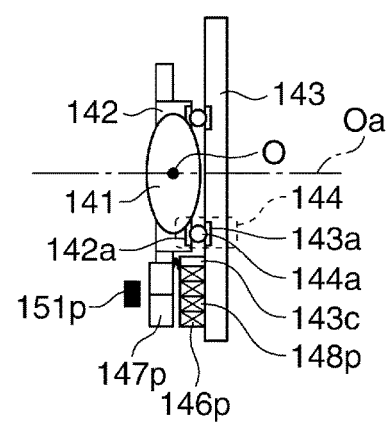
PITCH DIRECTION
→ YAW DIRECTION

PITCH DIRECTION ↑
→ YAW DIRECTION

PITCH DIRECTION ↑
→ YAW DIRECTION

PITCH DIRECTION ↑
→ YAW DIRECTION a(x) —
b(x) ----

FIRST COIL —
SECOND COIL ----

DETECTION POSITION x

DETECTION POSITION x

DRIVING DEVICE PROVIDED IN IMAGE STABILIZER, CONTROL METHOD THEREFOR, AND IMAGE PICKUP APPARATUS

BACKGROUND OF THE INVENTION

Field of the Invention

The present invention relates to a driving device, a control method therefor, and an image pickup apparatus, and in particular, relates to the driving device provided in an image stabilizer of an image pickup apparatus, such as a digital camera.

Description of the Related Art

An image pickup apparatus is provided with an image stabilizer for correcting a blur of an image formed on an image pickup surface through an optical system. The image stabilizer controls to move an optical element in the optical system in response to a shake due to an external force in order to reduce a blur of an image. Then, the image stabilizer is needed to move the optical element largely in order to correct a large shake.

For example, there is an image stabilizer that uses a voice coil motor (VCM) as a driving source and that reduces decline in a driving efficiency without enlarging the driving device when the optical element is largely moved (see Japanese Laid-Open Patent Publication (Kokai) No. 2000-19577 (JP 2000-19577A)).

The image stabilizer disclosed in the above-mentioned publication arranges the VCM so that a center of a voice coil is coincident with a center of a magnet when viewed in an optical axis direction. Then, a moving part on which the optical member is mounted is moved by moving the voice coil around the center of the magnet as a drive center. In this case, when viewed in the optical axis direction, a thrust in a moving direction becomes zero when the center of the voice coil is located near a position where magnetic flux density of the magnet is maximized. Accordingly, it is necessary to enlarge the width of the magnet and the width of the coil in order to increase the movable amount of the moving part.

However, when the width of the magnet and the width of the coil increase, the diameter of the driving device increases more than the addition of the movable amount. That is, when the image stabilizer using the VCM as a driving source expands the movable amount, the diameter of the driving device increases more than the addition of the movable amount.

SUMMARY OF THE INVENTION

The present invention provides a driving device that is capable of suppressing enlargement of diameter when a movable amount of a moving part is enlarged, a control method therefor, and an image pickup apparatus equipped with the driving device.

Accordingly, a first aspect of the present invention provides a driving device for driving a moving part that is movably supported by a fixing part in a predetermined direction, the driving device comprising a drive unit configured to have a first actuator and a second actuator each of which is provided with a coil arranged in one of the fixing part and the moving part and a magnet arranged in the other part so as to face the coil, and to give a thrust to the moving part so as to drive the moving part in the predetermined direction, and a control unit configured to control the drive unit by controlling an electric current supplied to the coil of the first actuator in response to a result obtained by multiplying a first coefficient that varies in response to the position of the moving part to a first control value obtained from a first function based on the position of the moving part, and by controlling an electric current supplied to the coil of the second actuator in response to a result obtained by multiplying a second coefficient that varies in response to the position of the moving part to a second control value obtained from a second function that is different from the first function based on the position of the moving part.

Accordingly, a second aspect of the present invention provides a driving device for driving a moving part that is movably supported by a fixing part in a predetermined direction, the driving device comprising a drive unit configured to give a thrust to the moving part so as to drive the moving part in the predetermined direction, and a control unit configured to control the drive unit based on a function that varies in response to the position of the moving part.

Accordingly, a third aspect of the present invention provides an image pickup apparatus comprising the driving device of the second aspect, and an optical element held by the moving part. The control unit controls the drive unit so as to correct a blur of an image formed on an image pickup surface through an optical system.

Accordingly, a fourth aspect of the present invention provides an image pickup apparatus comprising the driving device of the first aspect, and an optical element held by the moving part. The control unit controls the drive unit so as to correct a blur of an image formed on an image pickup surface through an optical system.

Accordingly, a fifth aspect of the present invention provides a control method for a driving device having a drive unit that drives a moving part that is movably supported by a fixing part in a predetermined direction, the control method comprising a first step of obtaining a control value from a function that varies according to a position of the moving part in response to a detection position of the moving part, and a second step of controlling the drive unit based on the control value.

Accordingly, a sixth aspect of the present invention provides a control method for a driving device having a drive unit that drive a moving part that is movably supported by a fixing part in a predetermined direction, and a first actuator and a second actuator each of which is provided with a coil arranged in one of the fixing part and the moving part and a magnet arranged in the other part so as to face the coil, the control method comprising a first step of obtaining a first result by multiplying a first coefficient that varies in response to the position of the moving part to a first control value obtained from a first function based on the position of the moving part, and obtaining a second result by multiplying a second coefficient that varies in response to the position of the moving part to a second control value obtained from a second function based on the position of the moving part, and a second step of controlling an electric current supplied to the coil of the first actuator in response to the first result, and controlling an electric current supplied to the coil of the second actuator in response to the second result.

According to the present invention, the enlargement of the diameter is suppressed even if the movable amount of the movable member is enlarged.

Further features of the present invention will become apparent from the following description of exemplary embodiments with reference to the attached drawings.

BRIEF DESCRIPTION OF THE DRAWINGS

FIG. 2A and FIG. 2B are views showing a first example of a configuration of the image stabilizer shown in FIG. 1, FIG. 2A is a front view and FIG. 2B is a sectional view.

FIG. 3A is a front view and FIG. 3B is a sectional view.

FIG. 5A is a front view and FIG. 5B is a sectional view.

FIG. 6A is a front view and FIG. 6B is a sectional view.

FIG. 7A is a front view and FIG. 7B is a sectional view.

FIG. 8A is a front view and FIG. 8B is a sectional view.

FIG. 9A is a front view and FIG. 9B is a sectional view.

FIG. 10A and FIG. 10B are views showing a seventh example of a configuration of the image stabilizer shown in FIG. 1, FIG. 10A is a front view and FIG. 10B is a sectional view.

FIG. 11A is a front view and FIG. 11B is a sectional view.

FIG. 12A is a sectional view showing a case where a moving part is located at a center of a movable range. Moreover, FIG. 12B is a sectional view showing a case where a magnetization interface of a first magnet is located at a position just before reaching a coil wire bundle part of a first coil at a side far from the optical element. Furthermore, FIG. 12C is a sectional view showing a case where the magnetization interface of the first magnet reached the coil wire bundle part of the first coil at the side far from the optical element.

FIG. 16A is a graph showing examples of first and second functions, FIG. 16B is a view showing an arrangement of the coil and magnet, FIG. 16C is a graph showing a thrust constant that is thrust per unit current, and FIG. 16D is a graphs showing an example of the thrust that occurs in the moving part.

FIG. 17A is a sectional view showing a case where the moving part is located at the center of the movable range, and FIG. 17B is a sectional view showing a case where the magnetization interface of the first magnet is located at a position just before reaching the coil wire bundle part of the first coil at the side far from the optical element.

FIG. 18A is a sectional view showing a case where a moving part is located at a center of a movable range, and FIG. 18B is a sectional view showing a case where a magnetization interface of a first magnet is located at a position just before reaching a coil wire bundle part of a first coil at the side far from the optical element.

FIG. 20A is a graph showing relation between a rotor rotation angle and drive load, FIG. 20B is a graph showing relation between the rotor rotation angle and a coefficient, and FIG. 20C is a graph showing relation between the rotor rotation angle and electric currents.

FIG. 21A is a graph showing relation between the position of the moving part and the drive load, FIG. 21B is a graph showing relation between the position of the moving part and the coefficient, and FIG. 21C is a graph showing relation between the position of the moving part and the electric currents.

FIG. 22A is a front view and FIG. 22B is a sectional view.

FIG. 23A is a graph showing relation between a moving amount of a moving part and electric currents, and FIG. 23B is a graph showing relation between the moving amount of the moving part and a thrust.

FIG. 24A is a front view and FIG. 24B is a sectional view.

FIG. 25A is a graph showing examples of first and second functions, FIG. 25B is a view showing an arrangement of a coil and magnet, FIG. 25C is a graph showing a thrust constant that is thrust per unit current, and FIG. 25D is a graphs showing an example of the thrust that occurs in the moving part.

FIG. 26A is a sectional view showing a case where a moving part reached an end of a movable range at a side of a first magnet, and FIG. 26B is a sectional view showing another case where the moving part reached the end of the movable range at the side of the first coil.

FIG. 27A is a graph showing examples of first and second functions, FIG. 27B is a view showing an arrangement of a coil and magnet, FIG. 25C is a graph showing a thrust constant that is thrust per unit current, and FIG. 25D is a graphs showing an example of the thrust that occurs in the moving part.

DESCRIPTION OF THE EMBODIMENTS

Hereafter, driving apparatuses of embodiments according to the present invention will be described in detail with reference to the drawings.

Figure 1:
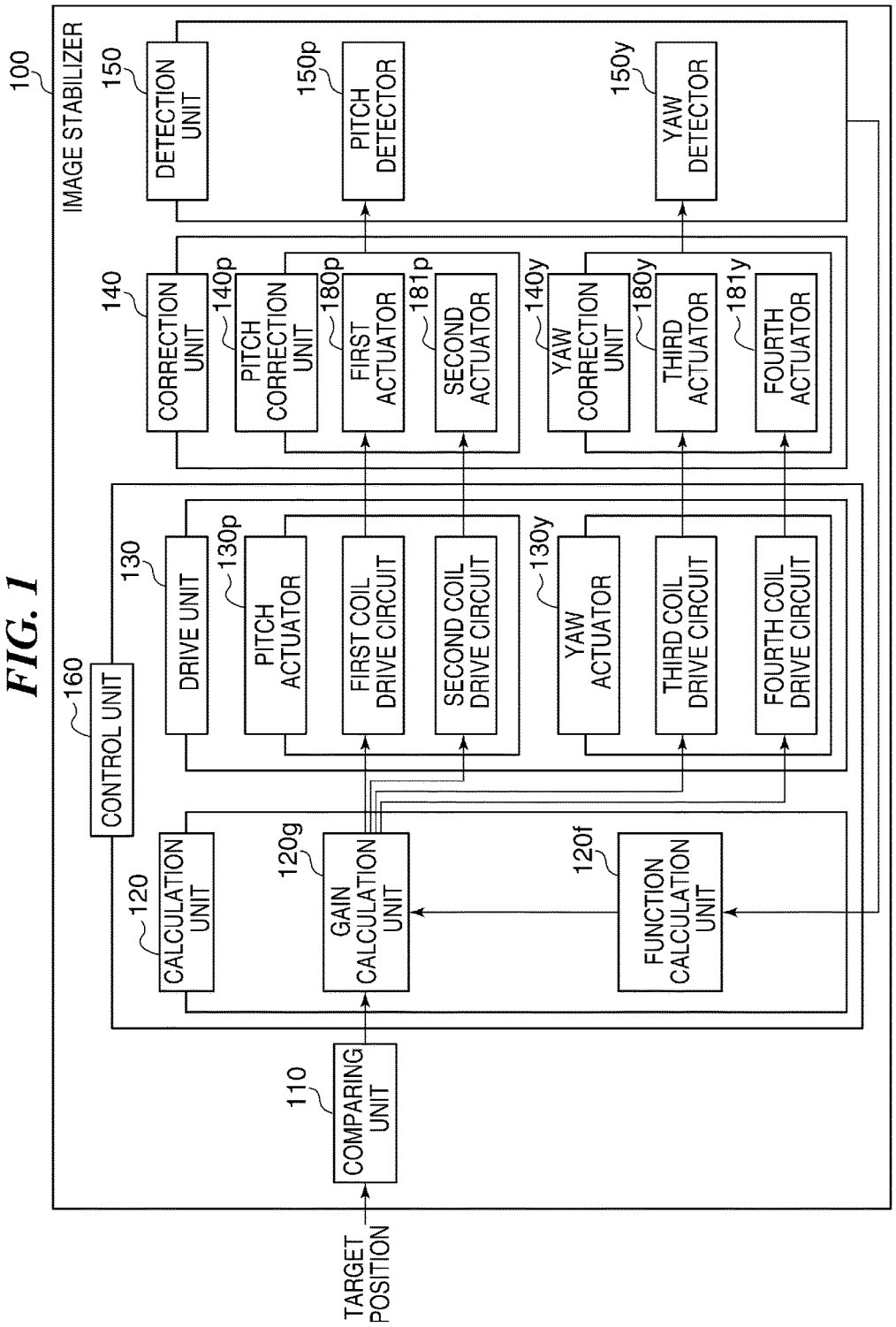
FIG. 1 is a block diagram schematically showing a configuration of an image stabilizer as an example of a driving device according to a first embodiment of the present invention.

FIG. 1 is a block diagram schematically showing a configuration of an image stabilizer as an example of a driving device according to a first embodiment of the present invention.

The illustrated image stabilizer 100 is built in an image pickup apparatus, such as a digital camera, and corrects a blur of an image formed on an image pickup surface through an optical system. The image stabilizer 100 has a comparing unit 110, calculation unit 120, drive unit 130, correction unit 140, and detection unit 150. Then, the calculation unit 120 and drive unit 130 constitute a control unit 160. The comparing unit 110 outputs a difference between a target position and detected position of a moving part (movable member) 142 mentioned later. The calculation unit 120 is provided with a gain calculation unit 120g and function calculation unit 120f. The gain calculation unit 120g finds a gain on the basis of the difference that is an output of the comparing unit 110. The function calculation unit 120f finds a ratio of electric currents that are supplied to coils on the basis of a detected position of the moving part 142. Then, the calculation unit 120 outputs values of the electric currents that are supplied to the coils.

The drive unit 130 has a pitch actuator 130p and yaw actuator 130y. The pitch actuator 130p is provided with first and second coil drive circuits for driving the moving part 142 in a pitch direction. The yaw actuator 130y is provided with third and fourth coil drive circuits for driving the moving part 142 in a yaw direction. Then, the drive unit 130 applies electric currents to the coils on the basis of the output of the calculation unit 120.

The correction unit 140 has a pitch correction unit 140p and yaw correction unit 140y. The pitch correction unit 140p is provided with a first actuator 180p and second actuator 181p for driving the moving part 142 in the pitch direction. The yaw correction unit 140y is provided with a third actuator 180y and fourth actuator 181y for driving the moving part 142 in the yaw direction. Each actuator of the correction unit 140 is provided with a coil and magnet. Then, an image stabilizing operation is performed by the first and second actuators of which coils are arranged so that longitudinal directions thereof are parallel. The detection unit 150 has a pitch detector 150p and yaw detector 150y that respectively detect the position of the moving part 142 in the pitch direction and yaw direction.

FIG. 2A and FIG. 2B are views showing a first example of a configuration of the image stabilizer 100 shown in FIG. 1, FIG. 2A is a front view and FIG. 2B is a sectional view.

The image stabilizer 100 is provided with an electric board 171. The above-mentioned comparing unit 110, calculation unit 120, and drive unit 130 are mounted on the electric board 171. Then, the electric board 171 is connected to a first coil 146p constituting the first actuator 180p, a second coil 148p constituting the second actuator 181p, a third coil 146y constituting the third actuator 180y, a fourth coil 148y constituting the fourth actuator 181y, a pitch detection element 151p constituting the pitch detector 150p, and a yaw detection element 151y constituting the yaw detector 150y through wiring (not shown).

The cylinder-shaped moving part 142 holds an optical element 141 in its center, and is movably attached to a fixing part 143 fixed to the image pickup apparatus. The optical element 141 is a lens. Movement of the moving part 142 in a direction that intersects an optical axis Oa of the optical element moves an image formed on an image plane. When an external shake, such as camera shake, is detected, the optical element 141 is moved in response to the shake concerned so as to reduce the image blur. It should be noted that the moving part 142 may hold an image pickup device, such as a CCD and CMOS, as the optical element 141 instead of the lens.

Three ball seats 142a are formed on a surface of the moving part 142 that faces the fixing part 143 as planes that intersect perpendicularly with the optical axis Oa at approximately equal angular intervals in a circumferential direction. Four spring hook members 142b are formed on an outer circumference of the moving part 142 at approximately equal angular intervals in the circumferential direction.

The fixing part 143 is approximately disc shape. Three ball seats 143a are formed on the fixing part 143 as planes that intersect perpendicularly with the optical axis Oa so as to face the ball seats 142a of the moving part 142. Moreover, four spring hook members 143b are formed inside the fixing part 143 so as to face the spring hook members 142b of the moving part 142.

An annular regulation member 143c is formed inside the fixing part 143. When the position of the moving part 142 varies largely, the moving part 142 runs into the regulation member 143c, which regulates the position of the moving part 142. The position of the moving part 142 at the time when the moving part 142 runs into the regulation member 143c and is regulated is referred to as a first position. Moreover, the position of the moving part 142 at the time when the moving part 142 runs into the opposite regulation member 143c and is regulated is referred to as a second position. Then, the movable range of the moving part 142 is defined as a range between the first position and the second position.

Support mechanisms (support members) 144 support the moving part 142 so as to be movable against the fixing part 143. Then, each of the support mechanisms 144 is provided with the ball seat 142a, the ball seat 143a, and a rolling ball 144a. The rolling balls 144a are spheres made from ceramics, and are arranged at three places so as to contact with the ball seats 142a and ball seats 143a. When the rolling balls 144a roll while being pinched between the ball seats 142a and 143a, the moving part 142 moves along the plane that intersects perpendicularly with the optical axis Oa without moving in the direction of the optical axis Oa against the fixing part 143.

Energization mechanisms 145 energize the moving part 142 so as to approach the fixing part 143. Then, each of the energization mechanisms 145 has a spring hook member 142b, spring hook member 143b, and tension spring 145a. The tension springs 145a are made from material, such as stainless steel, and are arranged at four places so as to be hooked between the spring hook members 142b and spring hook members 143b, respectively. When the moving part 142 moves, the tension springs 145a generate reaction forces in the direction opposite to the moving direction so as to return the moving part 142 to the center of the movable range. The larger the moving amount of the moving part 142 is, the larger the reaction force by the tension springs 145a is.

It should be noted that another mechanism may be employed in place of the tension springs 145a as long as the mechanism energizes the moving parts 142 to approach the fixing part 143. For example, a mechanism using a magnetic force that generates adsorptive power between the moving part 142 and fixing part 143 may be employed. Moreover, the material of the rolling balls, the material and the number of the tension springs are not limited to the above-mentioned example.

Figure 3A:
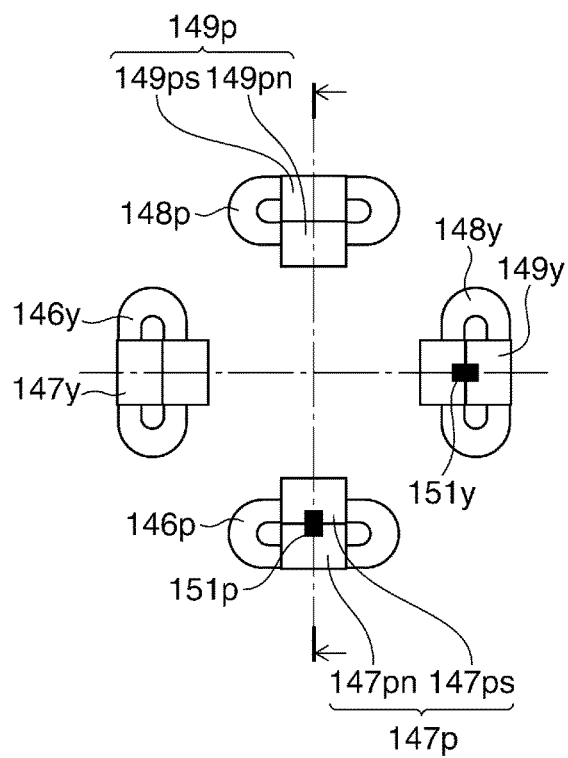
FIG. 3A and FIG. 3B are views for describing an arrangement of coils and magnets of a correction unit shown in FIG. 1.
Figure 3B:
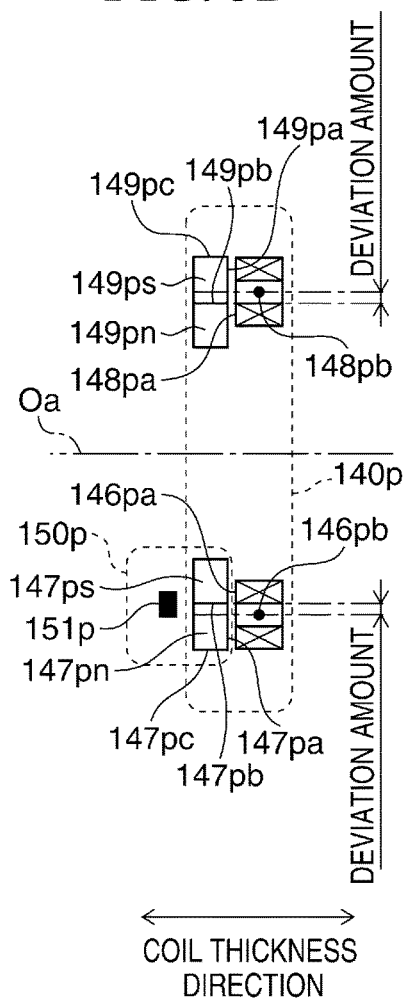

FIG. 3A and FIG. 3B are views for describing an arrangement of coils and magnets of a correction unit shown in FIG. 1, FIG. 3A is a front view and FIG. 3B is a sectional view.

The first coil 146*p* is formed in an approximately elliptic cylinder shape and is held by the fixing part 143. The first coil 146*p* is a winding coil that consists of a conducting wire wound in an elliptic form when viewed in the direction of the optical axis Oa. Then, one base 146*pa* of the elliptic cylinder of the first coil 146*p* faces a first magnet 147*p* mentioned later. In the description, a reference numeral 146*pb* shows the center of the first coil 146*p*.

The first magnet 147*p* is held by the moving part 142 so as to face the first coil 146*p*. A magnetizing direction of the first magnet 147*p* is coincident with a direction of a normal line of an opposite surface 147*pa* facing the first coil 146*p*, and a magnetization interface 147*pb* is parallel to a longitudinal direction of the first coil 146*p*. The first magnet 147*p* is provided with a first pole 147*pn* and second pole 147*ps* of which magnetizing directions are different. The first pole 147*pn* and second pole 147*ps* are divided by the magnetization interface 147*pb*. In the description, the first pole 147*pn* is distant from the optical axis Oa and the second pole 147*ps* is close to the optical axis Oa. Moreover, a reference number 147*pc* indicates an outer circumferential surface of the first magnet 147*p* that is the most distant from the optical element 141.

The second coil 148*p* is formed in an approximately elliptic cylinder shape and is held by the fixing part 143. The second coil 148*p* is a winding coil that consists of a conducting wire wound in an elliptic form when viewed in the direction of the optical axis Oa. Then, the longitudinal directions of the first coil 146*p* and second coil 148*p* are parallel. Furthermore, the optical element 141 is arranged between the first coil 146*p* and second coil 148*p*, when viewed in the direction of the optical axis Oa. One base 148*pa* of the elliptic cylinder of the second coil 148*p* faces the second magnet 149*p*. In the description, a reference numeral 146*pb* indicates the center of the second coil 148*p*.

Since the shape and arrangement of the second magnet 149*p* is the same as that of the first magnet 147*p*, the description therefor is omitted. Moreover, a reference number 149*pc* indicates an outer circumferential surface of the second magnet 149*p* that is the most distant from the optical element 141.

The first magnet 147*p* and second magnet 149*p* are arranged so as to overlap with the optical element 141 in the direction of the optical axis Oa. This prevents the thickness of an image stabilizer from increasing. Moreover, the first coil 146*p*, first magnet 147*p*, second coil 148*p*, and second magnet 149*p* are arranged so that they do not interfere even if the moving part 142 moves. Furthermore, the first coil 146*p*, first magnet 147*p*, second coil 148*p*, and second magnet 149*p* are arranged at the positions near the optical element 141 so that the radius of the image stabilizer becomes as small as possible.

The first coil 146*p* is arranged so that the center of the first coil 146*p* is deviated outwardly from the magnetization interface 147*pb* of the first magnet 147*p* in the radial direction of the optical element 141 by a predetermined deviation amount when the moving part 142 is located at the center of the movable range. Furthermore, the second coil 148*p* is arranged so that the center of the second coil 148*p* is deviated outwardly from the magnetization interface 149*pb* of the second magnet 149*p* in the radial direction of the optical element 141 by a predetermined deviation amount when the moving part 142 is located at the center of the movable range.

The pitch detection element 151*p* is a Hall sensor that detects a position by magnetism. The pitch detection element 151*p* is fixed to the fixing part 143 through a holder. Then, the pitch detection element 151*p* outputs change of the position of the first magnet 147*p* faced as an electrical signal. The detection output of the pitch detection element 151*p* is sent to the electric board 171.

The third coil 146*y* and fourth coil 148*y* that constitute the yaw correction unit 140*y* are respectively arranged at positions away from the first coil 147*p* and second coil 148*p* that constitute the pitch correction unit 140*p* by 90 degrees around the optical axis Oa in the plane that intersects perpendicularly with the optical axis Oa. Moreover, the third magnet 147*y* and fourth magnet 149*y* are arranged at the positions that respectively face the third coil 146*y* and fourth coil 148*y*. The yaw detection element 151*y* that constitutes the yaw detector 150*y* is arranged near the fourth magnet 149*y*. Since the yaw correction unit 140*y* and yaw detector 150*y* are the same as that of the pitch correction unit 140*p* and pitch detector 150*p* about the configuration and operation other than the arrangement direction, description of the configuration is omitted.

Figure 4:
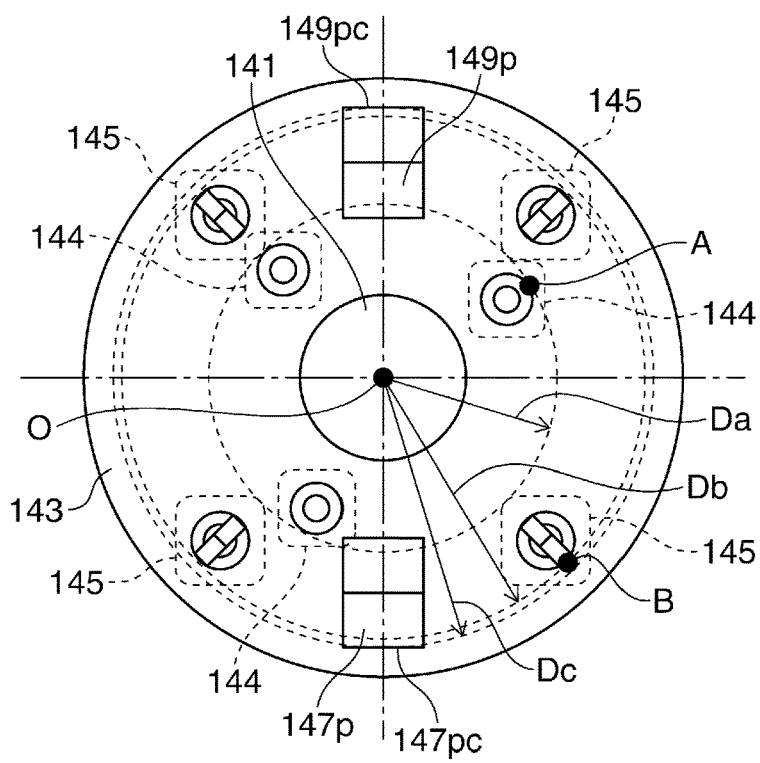
FIG. 4 is a front view for describing arrangements of support mechanisms and energization mechanisms that are shown in FIG. 2A.

FIG. 4 is a view for describing the arrangements of the support mechanisms 144 and energization mechanisms 145 that are shown in FIG. 2A.

Only the fixing part 143, first magnet 147*p*, second magnet 149*p*, support mechanisms 144, and energization mechanisms 145 are shown in FIG. 4. A point A is the most distant point of the support mechanism 144 from the optical axis Oa. A point B is the most distant point of the energization mechanism 145 from the optical axis Oa. A radius of a circle around the center point O of the optical element 141 that passes the point A shall be Da. A radius of a circle around the center point O that passes the point B shall be Db. And a radius of a circle around the center point O that touches the outer circumferential surface 147*pc* of the first magnet and the outer circumferential surface 149*pc* of the second magnet shall be Dc. In this case, relations of Da<Dc and Db<Dc are held.

As a result of this, the rolling balls 144*a* and tension springs 145*a* are arranged nearer to the optical axis Oa than the outer circumferential surfaces of the first magnet 147*p* and second magnet 149*p* when viewed in the direction of the optical axis Oa. Since the first magnet 147*p* and second magnet 149*p* are arranged near the optical element 141, the size of the image stabilizer 100 in the radial direction is made small.

Figure 5A:
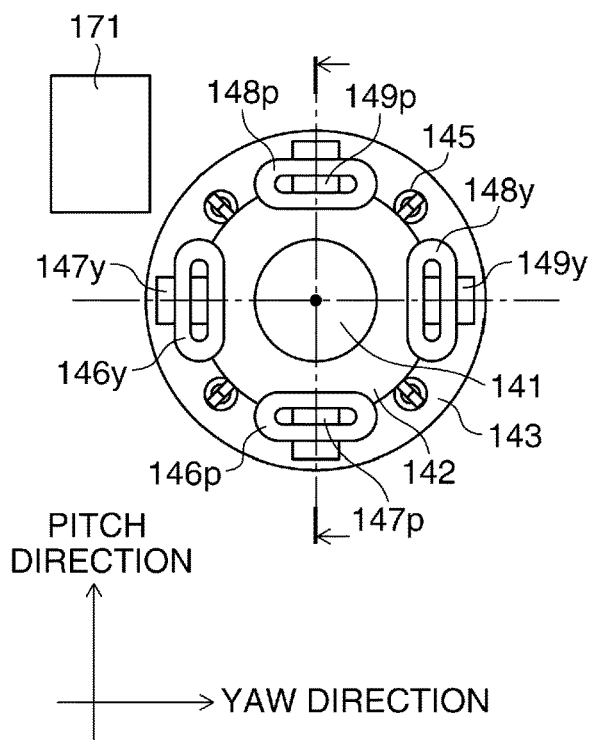
FIG. 5A and FIG. 5B are views showing a second example of a configuration of the image stabilizer shown in FIG. 1.
Figure 5B:
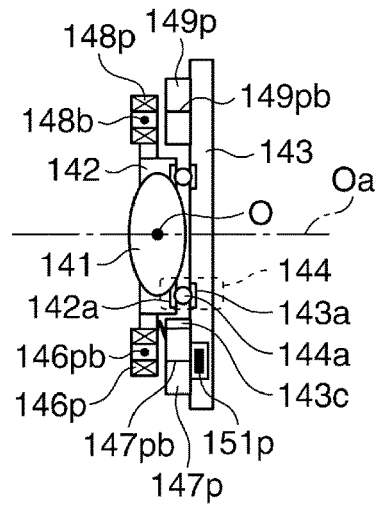

FIG. 5A and FIG. 5B are views showing a second example of a configuration of the image stabilizer shown in FIG. 1, FIG. 5A is a front view and FIG. 5B is a sectional view.

The image stabilizer may be configured as shown in FIG. 5A and FIG. 5B. It should be noted that components of the image stabilizer in FIG. 5A and FIG. 5B that are the same as the components of the image stabilizer in FIG. 2A and FIG. 2B are indicated by the same reference numbers and the descriptions thereof are omitted.

In the example shown in FIG. 5A and FIG. 5B, the coils are held by the moving part 142 and the magnets are held by the fixing part 143. It should be noted that such a configuration is called a moving coil system.

Figure 6A:
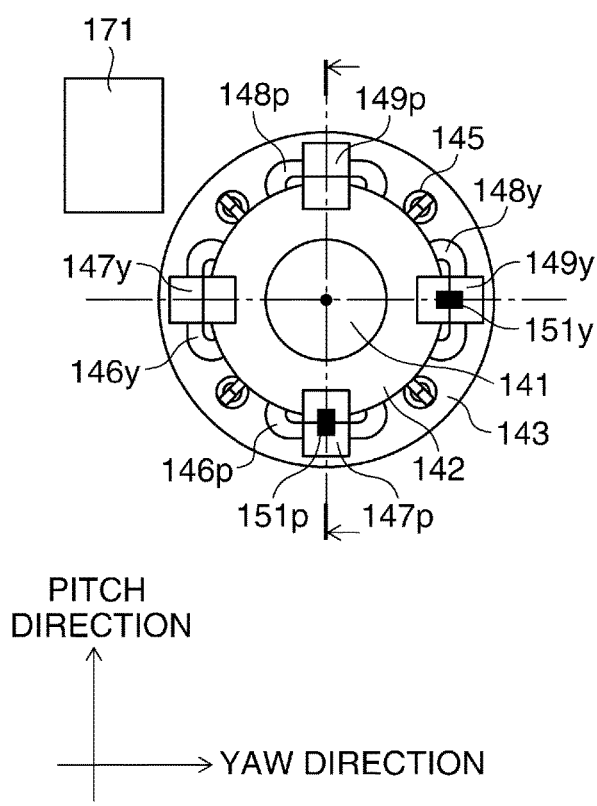
FIG. 6A and FIG. 6B are views showing a third example of a configuration of the image stabilizer shown in FIG. 1.
Figure 6B:
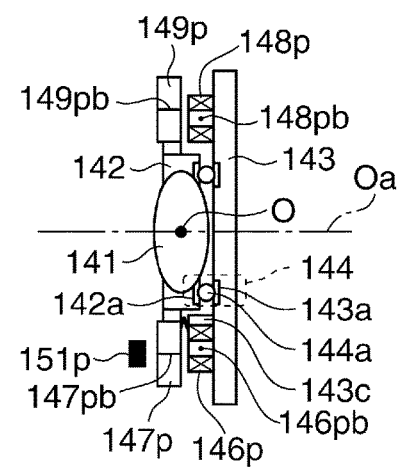

FIG. 6A and FIG. 6B are views showing a third example of a configuration of the image stabilizer shown in FIG. 1, FIG. 6A is a front view and FIG. 6B is a sectional view.

The image stabilizer may be configured as shown in FIG. 6A and FIG. 6B. It should be noted that components of the image stabilizer in FIG. 6A and FIG. 6B that are the same as the components of the image stabilizer in FIG. 2A and FIG. 2B are indicated by the same reference numbers and the descriptions thereof are omitted.

In the example shown in FIG. 6A and FIG. 6B, the first magnet 147$p$ is arranged so that the magnetization interface 147$pb$ of the first magnet 147$p$ is deviated outward from the center 146$pb$ of the first coil 146$p$ in the radial direction of the optical element 141 by a predetermined deviation amount when the moving part 142 is located at the center of the movable range. Furthermore, the second magnet 149$p$ is arranged so that the magnetization interface 149$pb$ of the second magnet 149$p$ is deviated outward from the center 148$pb$ of the second coil 148$p$ in the radial direction of the optical element 141 by a predetermined deviation amount when the moving part 142 is located at the center of the movable range.

Figure 7A:
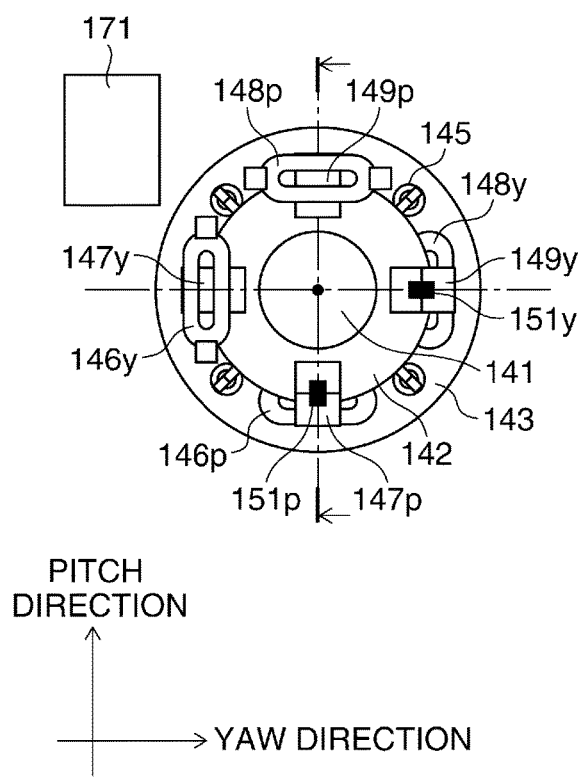
FIG. 7A and FIG. 7B are views showing a fourth example of a configuration of the image stabilizer shown in FIG. 1.
Figure 7B:
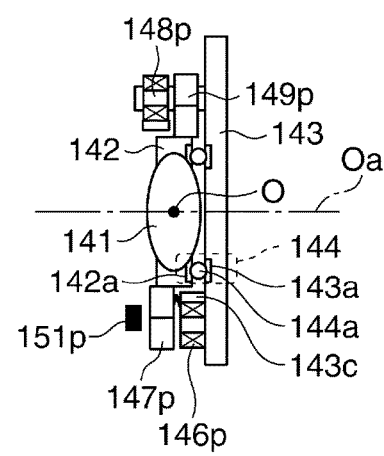

FIG. 7A and FIG. 7B are views showing a fourth example of a configuration of the image stabilizer shown in FIG. 1, FIG. 7A is a front view and FIG. 7B is a sectional view.

The image stabilizer may be configured as shown in FIG. 7A and FIG. 7B. It should be noted that components of the image stabilizer in FIG. 7A and FIG. 7B that are the same as the components of the image stabilizer in FIG. 2A and FIG. 2B are indicated by the same reference numbers and the descriptions thereof are omitted.

In the example shown in FIG. 7A and FIG. 7B, the second coil 148$p$ and the third coil 146$y$ are respectively held by arms extended from the fixing part 143 in front of the second magnet 149$p$ and the third magnet 147$y$ that respectively face the second coil 148$p$ and the third coil 146$y$, when viewed in the direction of the optical axis Oa. Other configurations are the same as that of the image stabilizer shown in FIG. 2A and FIG. 2B. That is, the first coil 146$p$ and the fourth coil 148$y$ are respectively arranged behind the first magnet 147$p$ and the fourth magnet 149$y$ that respectively face the first coil 146$p$ and fourth coil 148$y$.

Figure 8A:
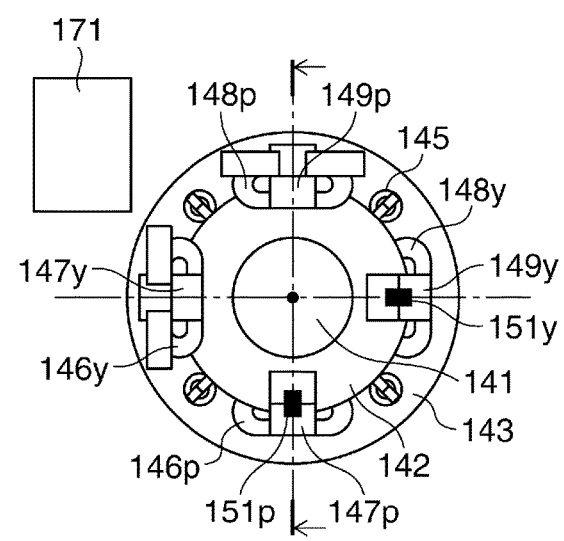
FIG. 8A and FIG. 8B are views showing a fifth example of a configuration of the image stabilizer shown in FIG. 1.
Figure 8B:
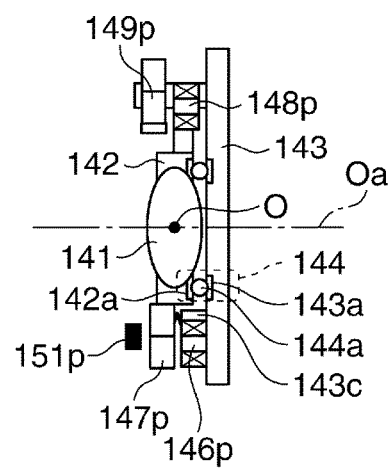

FIG. 8A and FIG. 8B are views showing a fifth example of a configuration of the image stabilizer shown in FIG. 1, FIG. 8A is a front view and FIG. 8B is a sectional view.

The image stabilizer may be configured as shown in FIG. 8A and FIG. 8B. It should be noted that components of the image stabilizer in FIG. 8A and FIG. 8B that are the same as the components of the image stabilizer in FIG. 2A and FIG. 2B are indicated by the same reference numbers and the descriptions thereof are omitted.

In the example shown in FIG. 8A and FIG. 8B, the second coil 148$p$ and third coil 146$y$ are held by the moving part 142. Moreover, the second magnet 149$p$ and the third magnet 147$y$ are respectively held by arms extended from the fixing part 143 in front of the second coil 148$p$ and the third coil 146$y$ that respectively face the second magnet 149$p$ and the third magnet 147. Other configurations are the same as that of the image stabilizer shown in FIG. 2A and FIG. 2B.

Figure 9A:
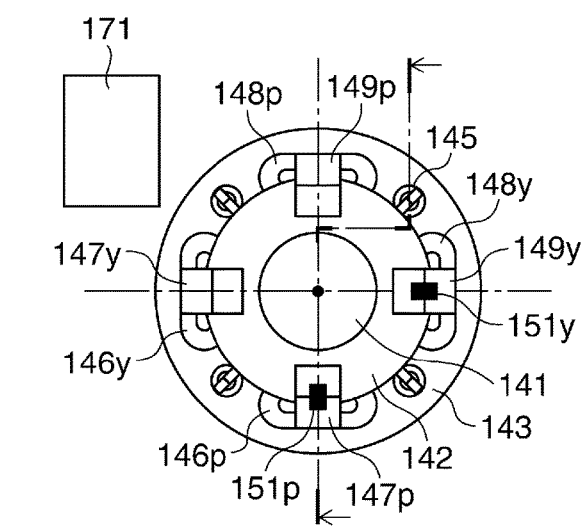
FIG. 9A and FIG. 9B are views showing a sixth example of a configuration of the image stabilizer shown in FIG. 1.
Figure 9B:
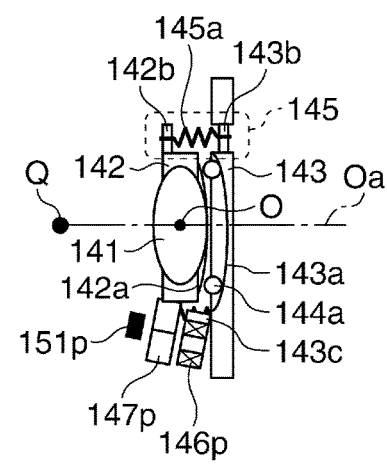

FIG. 9A and FIG. 9B are views showing a sixth example of a configuration of the image stabilizer shown in FIG. 1, FIG. 9A is a front view and FIG. 9B is a sectional view.

The image stabilizer may be configured as shown in FIG. 9A and FIG. 9B. It should be noted that components of the image stabilizer in FIG. 9A and FIG. 9B that are the same as the components of the image stabilizer in FIG. 2A and FIG. 2B are indicated by the same reference numbers and the descriptions thereof are omitted.

In the example shown in FIG. 9A and FIG. 9B, the ball seats 142$a$ and 143$a$ are spherical, and the coils, magnets, and detection elements are arranged so as to be tilted. Then, the moving part 141 moves along the spherical surface. Other configurations are the same as that of the image stabilizer shown in FIG. 2A and FIG. 2B.

FIG. 10A and FIG. 10B are views showing a seventh example of a configuration of the image stabilizer shown in FIG. 1, FIG. 10A is a front view and FIG. 10B is a sectional view.

The image stabilizer may be configured as shown in FIG. 10A and FIG. 10B. It should be noted that components of the image stabilizer in FIG. 10A and FIG. 10B that are the same as the components of the image stabilizer in FIG. 2A and FIG. 2B are indicated by the same reference numbers and the descriptions thereof are omitted.

In the example shown in FIG. 10A and FIG. 10B, the first coil 146$p$ and second coil 148$p$ that are used to drive in the pitch direction are held by the fixing part 143 and are located side-by-side at one side of the optical element 141. A circular part of the first coil 146$p$ bends in the thickness direction so as to climb over a circular part of the second coil 148$p$. Then, an inside linear part of the first coil 146$p$ enters into a hollow section of the second coil 148$p$. The first magnet 147$p$ is held by the moving part 142 so as to face the first and second coils.

Moreover, the third coil 146$y$ and fourth coil 148$y$ that are used to drive in the yaw direction are located side-by-side at one side of the optical element 141 in the same manner as the above-mentioned first and second coils. Then, the third magnet 147$y$ is held by the moving part 142 so as to face the third and fourth coils. The two magnets are used in this example. Other configurations are the same as that of the image stabilizer shown in FIG. 2A and FIG. 2B.

Figure 11A:
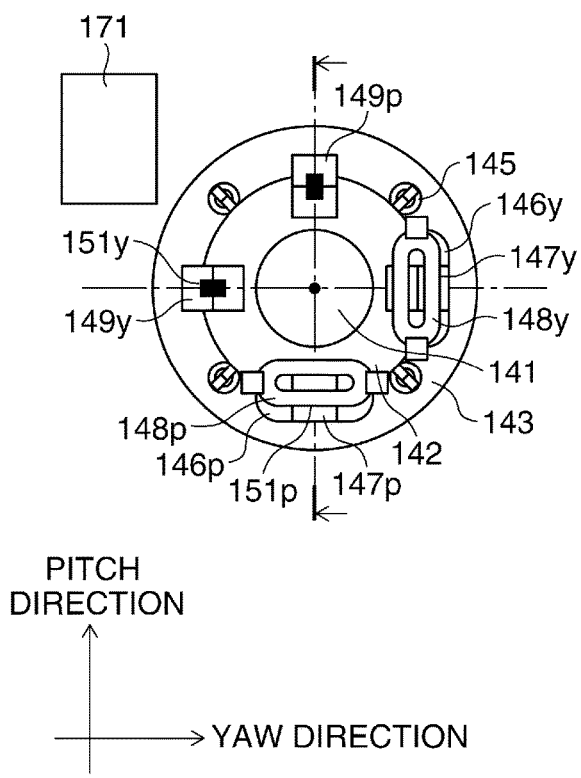
FIG. 11A and FIG. 11B are views showing an eighth example of a configuration of the image stabilizer shown in FIG. 1.
Figure 11B:
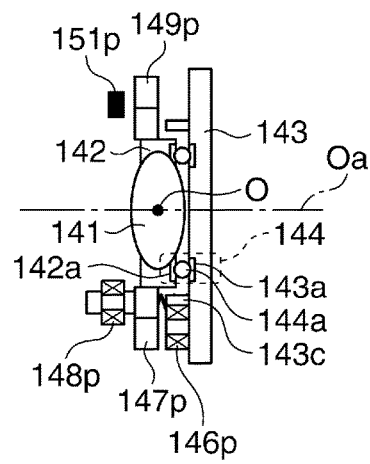

FIG. 11A and FIG. 11B are views showing an eighth example of a configuration of the image stabilizer shown in FIG. 1, FIG. 11A is a front view and FIG. 11B is a sectional view.

The image stabilizer may be configured as shown in FIG. 11A and FIG. 11B. It should be noted that components of the image stabilizer in FIG. 11A and FIG. 11B that are the same as the components of the image stabilizer in FIG. 2A and FIG. 2B are indicated by the same reference numbers and the descriptions thereof are omitted.

In the example shown in FIG. 11A and FIG. 11B, the first coil 146$p$ and second coil 148$p$ that are used to drive in the pitch direction are arranged on both sides in the optical axis direction so as to put the first magnet 147$p$ therebetween. Similarly, the third coil 146$y$ and fourth coil 148$y$ that are used to drive in the yaw direction are arranged on both sides in the optical axis direction so as to put the third magnet 147$y$ therebetween.

It should be noted that the second coil 148$p$ and the fourth coil 148$y$ are held by arms extended from the fixing part 143, respectively. Moreover, the pitch detection element 151$p$ and the yaw detection element 151$y$ are respectively arranged near the second magnet 149$p$ and the fourth magnet 149$y$. Other configurations are the same as that of the image stabilizer shown in FIG. 2A and FIG. 2B.

Figure 12A:
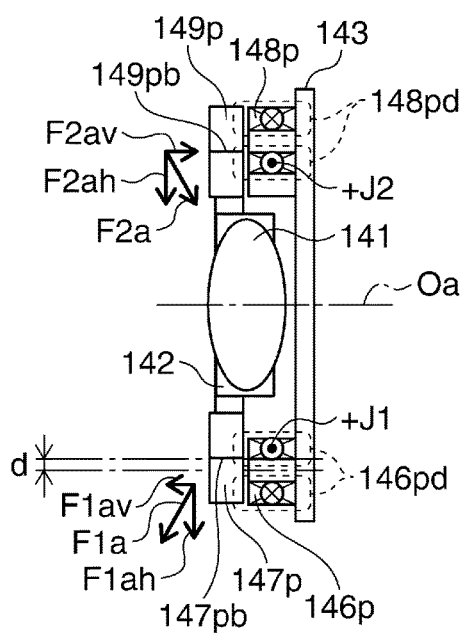
FIG. 12A, FIG. 12B, and FIG. 12C are views for describing an operation of the correction unit shown in FIG. 1.
Figure 12B:
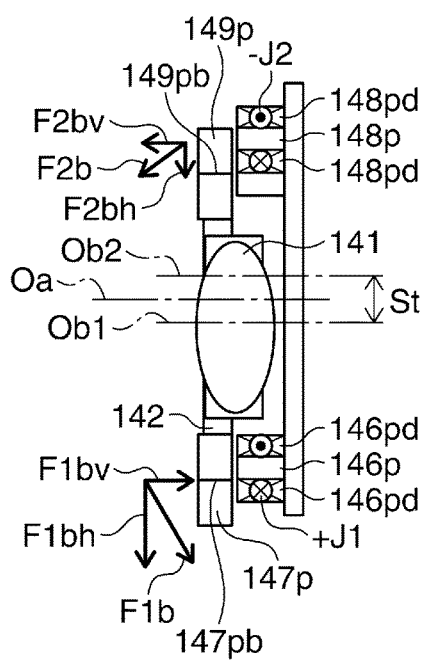
Figure 12C:
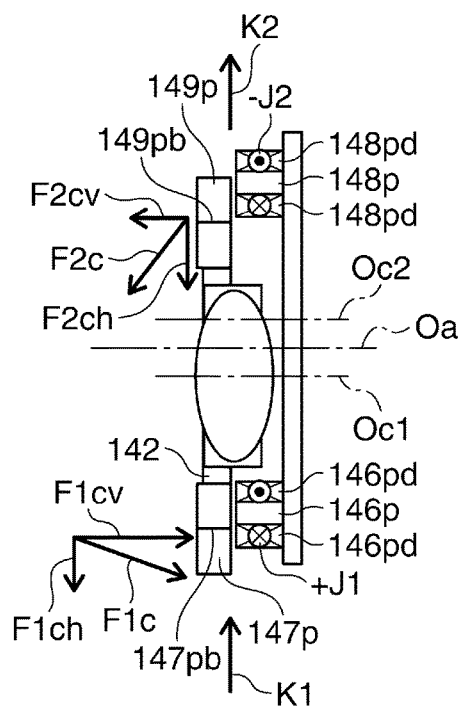

FIG. 12A, FIG. 12B, and FIG. 12C are views for describing an operation of the correction unit 140 shown in FIG. 1. In the description, the case where the optical element 141 is moved downwardly in the drawings for the image stabilization in the pitch direction will be described. FIG. 12A is a sectional view showing a case where the moving part 142 is located at the center of the movable range. Moreover, FIG. 12B is a sectional view showing a case where the magnetization interface 147pa of the first magnet 147p is located at a position just before reaching the coil wire bundle part of the first coil 146p at a side far from the optical element 141. Furthermore, FIG. 12C is a sectional view showing a case where the magnetization interface 147pa of the first magnet 147p reached the coil wire bundle part of the first coil 146p at the side far from the optical element 141. Only the parts relevant to the operation are shown in FIG. 12A, FIG. 12B, and FIG. 12C.

In FIG. 12A, both the deviation amount of the center of the first magnet 147p to the center of the first coil 146p and the deviation amount of the center of the second magnet 149p to the center of the second coil 148p are set to d. It should be noted that FIG. 12C shows the case where the regulation member 143c shall not regulate movement of the moving part 142.

When electric current is supplied to the first coil 146p and the second coil 148p in directions +J1 and +J2 that are mutually opposite so that force components in the moving direction are directed in the same direction in the state shown in FIG. 12A, the first magnet 147p and the second magnet 149p respectively generate forces F1a and F2a by electromagnetism function. In the description, a component of the force F1a in the moving direction shall be F1ah, and a component of the force F1a in a direction that intersects perpendicularly with the moving direction shall be F1av. Moreover, a component of the force F2a in the moving direction shall be F2ah, and a component of the force F2a in a direction that intersects perpendicularly with the moving direction shall be F2av.

In this case, a resultant force of the component F1ah and component F2ah becomes a thrust of the moving part 142. The component F1av and component F2av are surface external forces that move the moving part 142 in the direction that intersects perpendicularly with the moving direction. In FIG. 12A, the thrust occurs in the first magnet 147p and the second magnet 149p.

As shown in FIG. 12B, when the moving part 142 moves to a position just before the magnetization interface 147pb of the first magnet reaches the coil wire bundle part 146pd of the first coil at the side far from the optical element 141, the second magnet 149p climbs over the coil wire bundle part 148pd of the second coil, and the direction of the Lorentz force between the second coil 148p and second magnet 149p is reversed.

At this time, the electric current is supplied to the first coil 146p in the +J1 direction and the electric current is supplied to the second coil in a −J2 direction that is opposite to the +J2 direction in FIG. 12A so that the components in the moving direction of the Lorentz force are directed in the same direction. As a result of this, the forces F1b and F2b occur. A resultant force of a component F1bh and component F2bh becomes a thrust of the moving part 142. A component F1bv and component F2bv are surface external forces that move the moving part 142 in the direction that intersects perpendicularly with the moving direction.

In FIG. 12B, although the thrust is reduced because the second magnet 149p is apart from one side of the coil wire bundle part 146pd, the moving part 142 moves because the thrust occurs in the first magnet 147p.

As shown in FIG. 12C, when the moving part 142 moves and the magnetization interface 147pb of the first magnet reaches the coil wire bundle part 146pd of the first coil at the side far from the optical element 141, reaction forces K1 and K2 occur by the tension springs 145a.

An electric current is supplied to the first coil 146p in the +J1 direction and the force F1 occurs. An electric current is supplied to the second coil 148p in the −J2 direction and the force F2c occurs. A resultant force of a component F1ch and component F2ch becomes a thrust of the moving part 142. A component F1cv and component F2cv are surface external forces that move the moving part 142 in the direction that intersects perpendicularly with the moving direction.

In the state shown in FIG. 12C, since the magnetization interface 147pb of the first magnet 147p has reached the coil wire bundle part 146pd, the surface external force becomes larger than the thrust, and the thrust becomes small. Since the second magnet 149p is apart from one side of the coil wire bundle part 148pd, the thrust becomes small. In the position shown in FIG. 12C, the thrust balances with the sum of the reaction forces K1 and K2 of the tension springs 145a that energizes the moving part 142. As a result of this, the moving part 142 cannot move. That is, the position shown in FIG. 12C is a lower limit to which the moving part 142 moves.

Thus, if the regulation member 143c shall not regulate movement of the moving part 142, the moving part 142 can move to the position shown in FIG. 12C. However, the movable range is generally defined with giving a margin by taking the dispersion of the spring reaction force, etc. into consideration. Accordingly, the illustrated example is configured so that the moving part 142 contacts the regulation member 143c at the position shown in FIG. 12B. That is, the movable range is limited at the position shown in FIG. 12B. However, the movable range of the moving part 142 may be broader as long as the thrust occurs by arranging the regulation member 143c at a point farther from the center O of the optical element 141.

When the moving part 142 is moved in the direction opposite to the moving direction described in FIG. 12A, FIG. 12B, and FIG. 12 C, the directions of the electric currents and the directions of the forces mentioned above are reversed.

Figure 13:
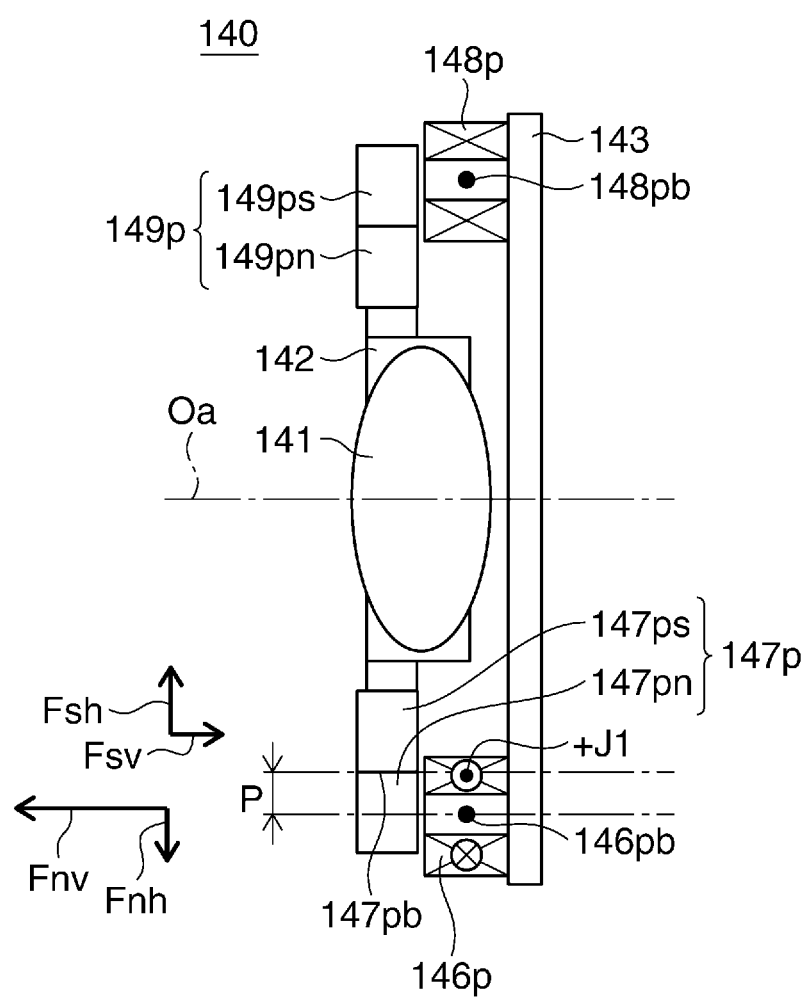
FIG. 13 is a view for describing a set limit value of a deviation amount between the coil and magnet of the correction unit shown in FIG. 1.

FIG. 13 is a view for describing a set limit value of the deviation amount between the coil and magnet of the correction unit shown in FIG. 1.

In the example shown in FIG. 13, the deviation amount between the coil and magnet is set to a limit value P and the regulation member 143c shall not regulate movement of the moving part 142. It should be noted that FIG. 13 shows only the parts relevant to the operation and shows the state where the moving part 142 is located at the center of the movable range.

The limit value P is set that the force Fnh that occurs in the first pole 147pn of the first magnet in the moving direction by applying an electric current to the first coil 146p in the +J1 direction is balanced with the force Fsh that occurs in the second pole 147ps in the moving direction. As a result of this, the Lorentz force that occurs between the first coil 146p and first magnet 147p consists of the surface external forces Fnv and Fsv only, and no thrust occurs. Similarly, the Lorentz force that occurs between the second coil 148p and second magnet 149p generates no thrust. Accordingly, the thrust that moves the moving part 142 does not occur, and the moving part 142 does not move. On the other hand, if the deviation amount is less than the limit value P, the component in the moving direction of the Lorentz force will occur. This enables to move the moving part 142.

Since a thrust occurs when the deviation amount is less than the limit value P, it is necessary that the deviation amount d shown in FIG. 5 be less than the limit value P. Since a thrust occurs when the deviation amount d is less than the limit value P, the moving part 142 can be moved from the center of the movable range.

Figure 14:
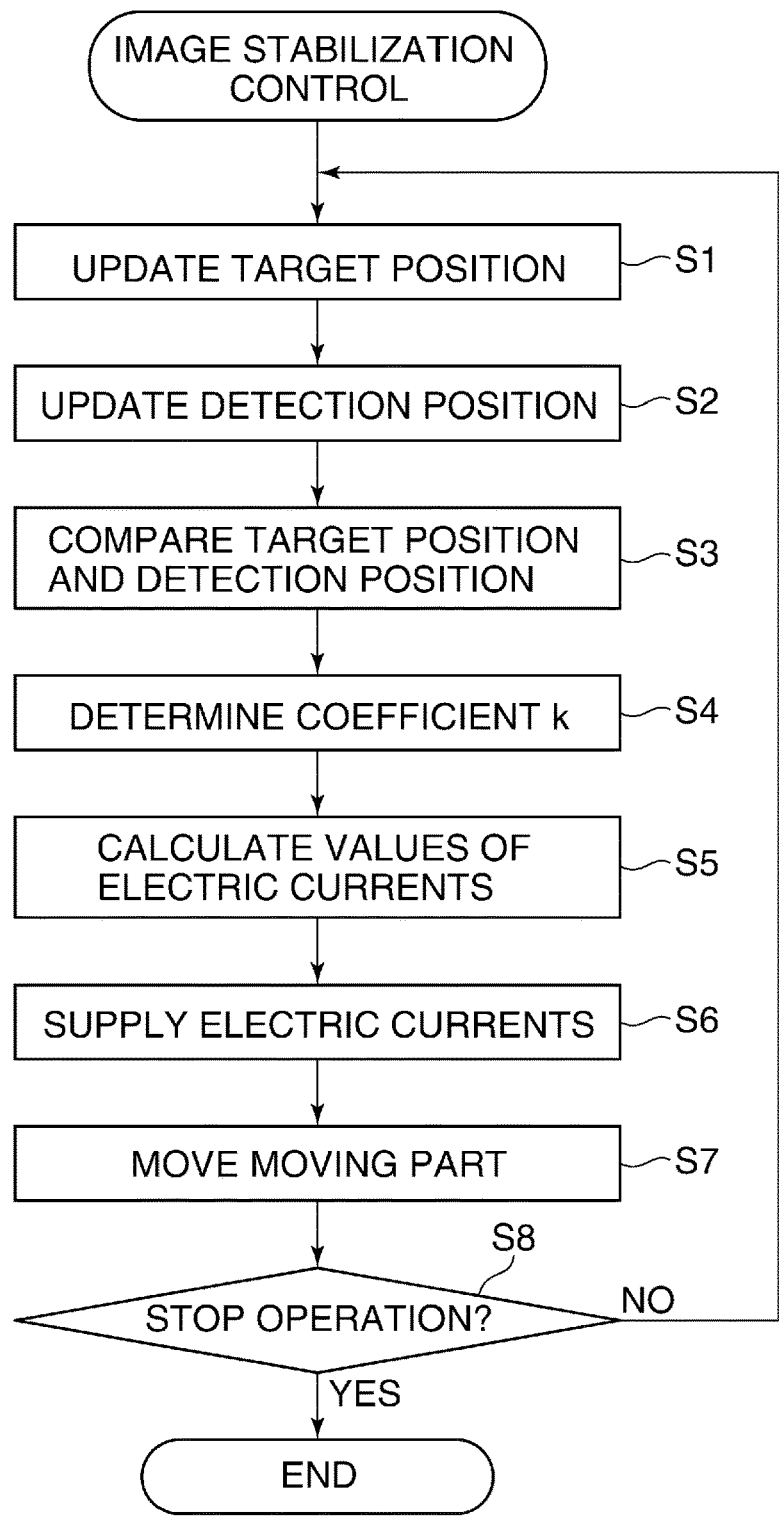
FIG. 14 is a flowchart for describing an example of image stabilization control by the image stabilizer shown in FIG. 1.

FIG. 14 is a flowchart for describing an example of image stabilization control by the image stabilizer shown in FIG. 1.

When the image stabilization control is started, the control unit 160 updates the target position at which the moving part 142 should arrive (step S1). Then, the control unit 160 updates the detection position of the moving part 142 on the basis of the detection result by the detection unit 150 (step S2). Subsequently, the control unit 160 calculates the difference between the target position and detection position by the comparing unit 110 (step S3).

Next, the control unit 160 determines a coefficient k on the basis of the difference by the gain calculation unit 120g (step S4). The larger the coefficient k is, the larger the force to move the moving part 142 is.

Figure 15:
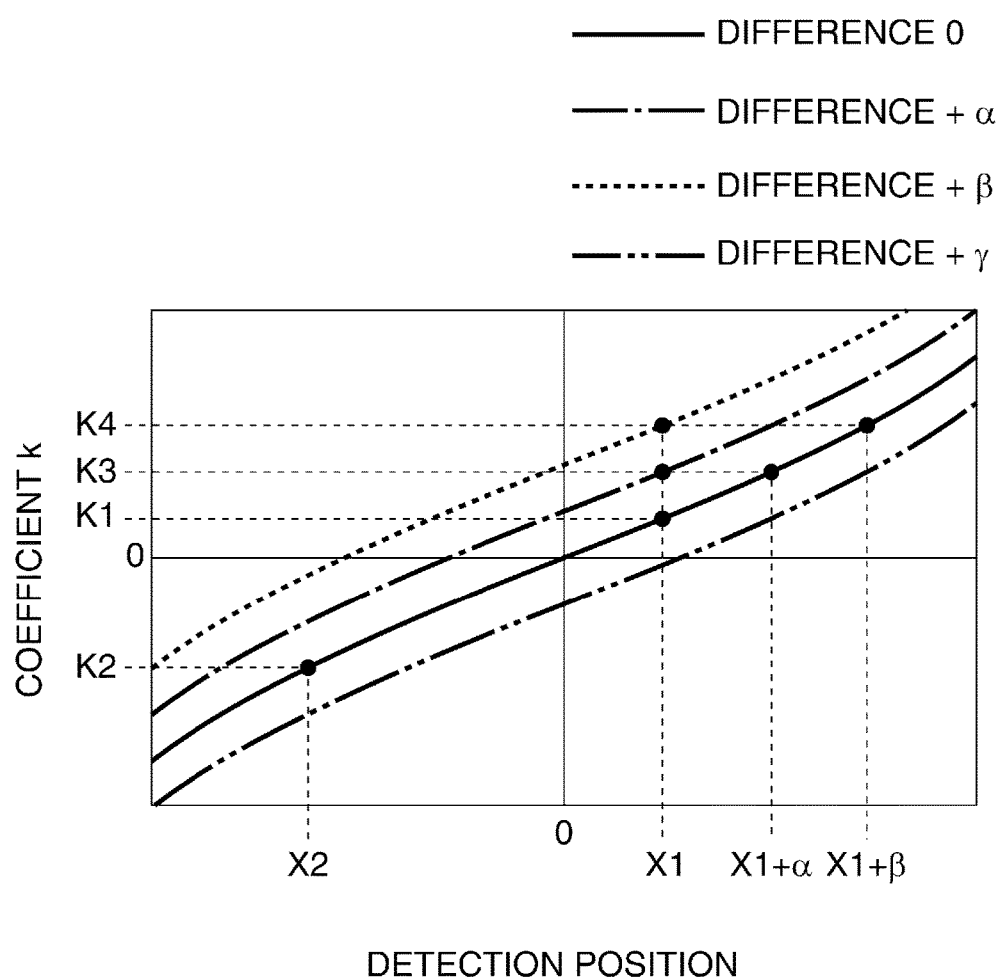
FIG. 15 is a graph showing an example of a coefficient determined by a gain calculation unit shown in FIG. 1.

FIG. 15 is a graph showing an example of the coefficient k determined by the gain calculation unit shown in FIG. 1.

In FIG. 15, a horizontal axis indicates the detection position of the moving part 142, and a vertical axis indicates the coefficient k. When the difference between the target position and the detection position is "0", the spring reaction force by the tension springs 145a becomes "0" in the center position of the movable range where the detection position becomes "0". In this case, the gain calculation unit 120g determines that the coefficient k is equal to "0". As a result of this, a thrust does not occur and the moving part 142 stops at the center position of the movable range.

When the moving part 142 moves to a position X1 and when the difference is "0", the gain calculation unit 120g determines that the coefficient k is equal to K1. As a result of this, the thrust of resistance against the spring reaction force by the tension springs 145a occurs, and the moving part 142 stops at the position X1. When the moving part 142 moves to a position X2 and when the difference is "0", the gain calculation unit 120g determines that the coefficient k is equal to K2. As a result of this, the thrust of resistance against the spring reaction force that acts in the direction opposite to the case where the moving part 142 moves to the position X1 occurs, and the moving part 142 stops at the position X2.

Thus, the coefficient k varies according to the detection position of the moving part 142. When the moving part 142 moves largely, the reaction force by the tension springs 145a becomes large, and the absolute value of the coefficient k becomes large. Thus, when the difference between the target position and the detection position is "0", the gain calculation unit 120g determines the coefficient k according to the detection position of the moving part 142.

Subsequently, the case where the difference between the target position and the detection position is not "0" will be described. When the detection position is X1 and the target position is X1+α, the difference becomes +α. In such a case, a thrust that is larger than the thrust to keep the moving part 142 at the position X1 is needed in order to resist larger spring reaction force. Accordingly, when the difference is +α, the gain calculation unit 120g determines that the coefficient k is equal to K3 as shown by a curve of the difference +α in FIG. 15.

On the other hand, when the detection position is X1 and the target position is X1+β, the gain calculation unit 120g determines that the coefficient k is equal to K4 as shown by a curve of the difference +β in FIG. 15.

When the target position is closer to the center position of the movable range than the detection position, the coefficient k is determined by subtracting a predetermined value corresponding to a superfluous thrust from the coefficient k in the case of the difference "0" as shown by a curve of difference γ in FIG. 15.

Thus, the value of the coefficient k varies according to the detection position and the difference between the detection position and the target position. It should be noted that the coefficient k may be a certain value corresponding to the target position.

Referring back to FIG. 14, the control unit 160 calculates the values of the electric currents that are supplied to the coils by the function calculation unit 120f (step S5). The function calculation unit 120f stores a first function a(x) and second function b(x) that are functions of the detection position of the moving part 142. Then, the function calculation unit 120f determines a first distribution value (first control value) d1 that is obtained by the first function a(x) and the detection position of the moving part 142 that is obtained on the basis of the detection result by the detection unit 150. Furthermore, the function calculation unit 120f determines a second distribution value (second control value) d2 that is obtained by the second function b(x) and the detection position of the moving part 142 that is obtained on the basis of the detection result by the detection unit 150.

In the description, x indicates the detection position of the moving part 142, and the first and second distribution values d1 and d2 respectively indicate ratios of the electric currents that are supplied to the first coil 146p and second coil 148p. Then, the function calculation unit 120f outputs the first distribution value d1 and the second distribution value d2 to the gain calculation unit 120g.

Figure 16A:
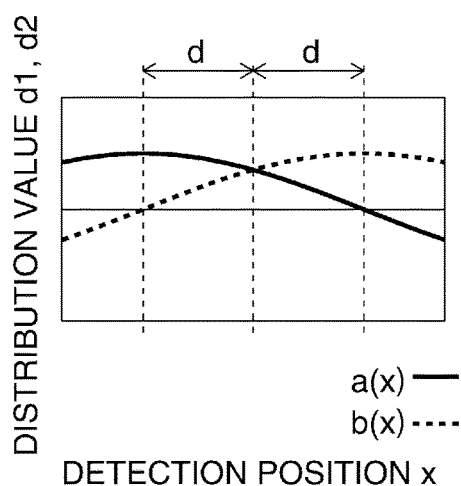
FIG. 16A, FIG. 16B, FIG. 16C, and FIG. 16D are views for describing the control of the moving part performed by a control unit shown in FIG. 1.
Figure 16B:
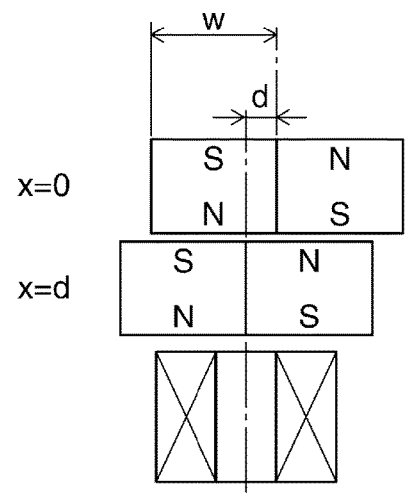
Figure 16C:
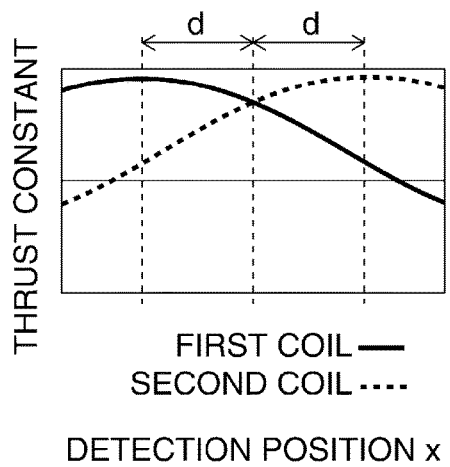
Figure 16D:
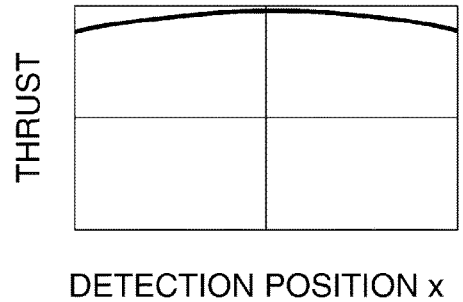

FIG. 16A, FIG. 16B, FIG. 16C, and FIG. 16D are views for describing the drive control for the moving part performed by the control unit shown in FIG. 1. Then, FIG. 16A is a graph showing examples of the first function and second function, and FIG. 16B is a view showing arrangements of the magnet and coil. Moreover, FIG. 16C is a graph showing a thrust constant that is a thrust per unit current. And FIG. 16D is a graph showing an example of a thrust that occurs in the moving part.

As shown in FIG. 16B, a length of each pole in the direction that intersects perpendicularly with the magnetization interface of the magnet is indicated by w, and a deviation amount of the magnet against the coil is indicated by d. In this case, the first function a(x) and the second function b(x) are respectively denoted by the following formulas (1) and (2) as mentioned later.

$$a(x)=\sin\left[\{2\pi(x+d)\}/2w\right] \quad (1)$$

$$b(x)=\sin\left[\{2\pi(x-d)\}/2w\right] \quad (2)$$

Both the first function a(x) and second function b(x) are trigonometric functions, and they are related so that the sum of squares of the functions becomes constant. Since the first function and second function are trigonometric functions, the above-mentioned relation is satisfied in order to drive the moving part 142 smoothly like microstep drive for a stepping motor. Furthermore, since the phases of the first function and second function are respectively shifted by the deviation amount d, the first function and second function are maximized at a position where the moving part 142 moves by d. As a result, the electric currents that are supplied to the coils are maximized.

In this position, the magnetization interface of the magnet overlaps with the center of the coil when viewed in the optical axis direction as shown in the case of "x=d" in FIG. 16B. This positional relationship between the magnet and coil maximizes a thrust constant that is a thrust per unit current as shown in FIG. 16C, and generates a thrust most efficiently. Accordingly, when the phases of the first function and second function are respectively shifted by the deviation amount d, one set of the coil and magnet generates the maximum thrust at the most efficient position.

Thus, when the first function and second function are defined as the trigonometric functions of which the phases are shifted by the deviation amount, the thrust occurs smoothly and efficiently as shown in FIG. 16D. Although the first function and second function are defined as the trigonometric functions in the illustrated example, other two functions may be employed as long as the mutual size relation of the functions switches near the center of the movable range of the moving part and the functions are applied to the operation of the image stabilizer 100.

The gain calculation unit 120g uses a first multiplication value k*d1 that is obtained by multiplying the coefficient k to the first distribution value d1 as the electric current applying to the first coil 146p. Furthermore, the gain calculation unit 120g uses a second multiplication value k*d2 that is obtained by multiplying the coefficient k to the second distribution value d2 as the electric current applying to the second coil 148p.

Subsequently, the control unit 160 applies the electric current found in the step S5 to the coils of the correction unit 140 by the coil driving circuits of the drive unit 130 (step S6). As a result of this, the control unit 160 controls the first actuator 180p on the basis of the first distribution value d1 and the coefficient k. Furthermore, the control unit 160 controls the second actuator 181p on the basis of the second distribution value d2 and the coefficient k. Then, the Lorentz force is generated by the magnets and coils in response to the electric currents supplied to the coils, and the moving part 142 is moved (step S7).

Next, the control unit 160 determines whether the operation of the moving part 142 will be stopped (step S8). When it is determined that the operation of the moving part 142 will not be stopped (NO in the step S8), the control unit 160 returns the process to the step S1, and continues the image stabilization control. On the other hand, when it is determined that the operation of the moving part 142 will be stopped (YES in the step S8), the control unit 160 finishes the image stabilization control.

Thus, the first distribution value d1 is determined on the basis of the first function a(x) that is a function of the position of the moving part 142 and the position of the moving part 142 (detection position). Furthermore, the second distribution value d2 is determined on the basis of the second function b(x) that is a function of the position of the moving part 142 and the position of the moving part 142 (detection position). Then, the electric currents supplied to the coils are controlled on the basis of the first distribution value d1, the second distribution value d2, and the coefficient k that varies in response to the position of the moving part 142.

Figure 17A:
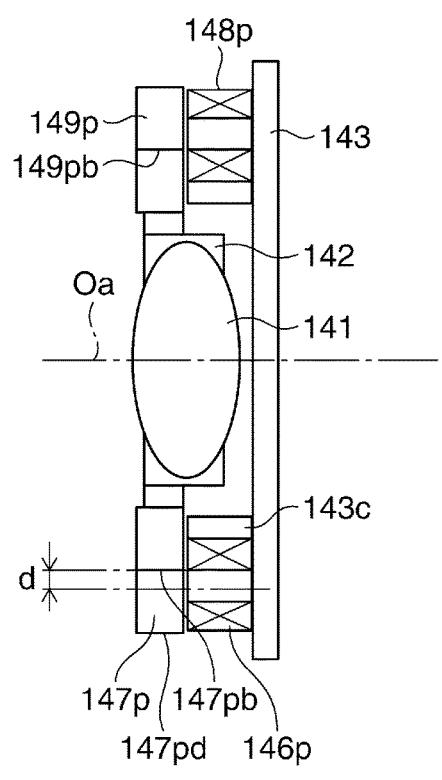
FIG. 17A and FIG. 17B are views for describing an effect of the image stabilizer according to the first embodiment of the present invention.
Figure 17B:
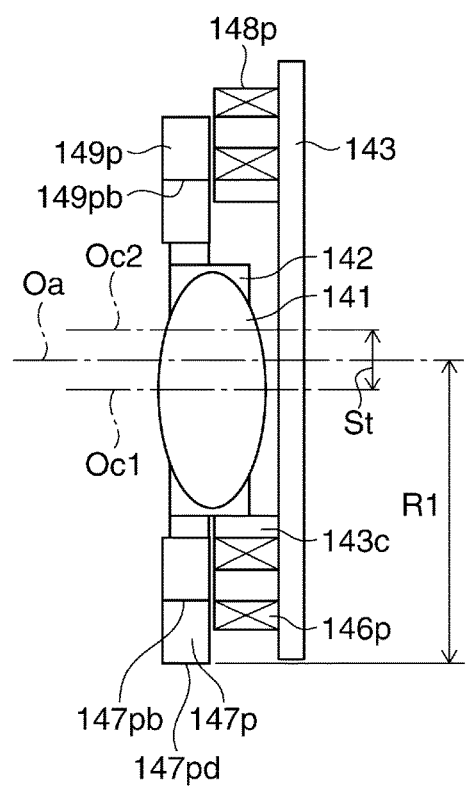

FIG. 17A and FIG. 17B are views for describing an effect of the image stabilizer according to the first embodiment of the present invention. Only the parts relevant to the operation are shown in FIG. 17A and FIG. 17B.

The moving part 142 is located at the center of the movable range in FIG. 17A. Then, the optical axis of the optical element 141 in this case shall be represented by a symbol Oa. In FIG. 17B, the moving part 142 is located at a position just before the magnetization interface 147pb of the first magnet reaches the coil wire bundle part 146pd of the first coil at the side far from the optical element 141, and the moving part 142 contacts the regulation member 143c so that the further movement is regulated. Then, the optical axis of the optical element 141 in this case shall be represented by a symbol Oc1, and the optical axis of the optical element 141 in a case where the moving part 142 contacts the regulation member 143c of the opposite side shall be represented by a symbol Oc2.

The movable amount of the moving part 142 is equivalent to a moving distance St at which the moving part 142 moves over the above-mentioned movable range. The distance from an outside 147pd of the first magnet 147p to the optical axis Oa is represented by a symbol R1. The longer this distance R1 is, the larger the size of the image stabilizer 100 in the radial direction is.

Figure 18A:
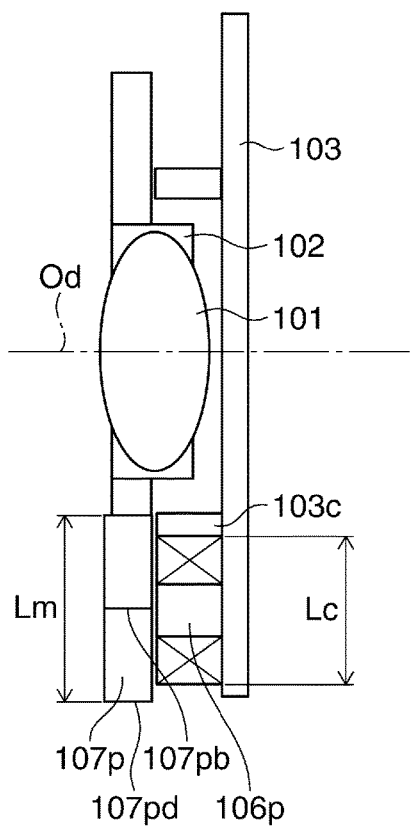
FIG. 18A and FIG. 18B are views for describing an image stabilizer of a comparative example that uses one coil and one magnet for driving in a pitch direction.
Figure 18B:
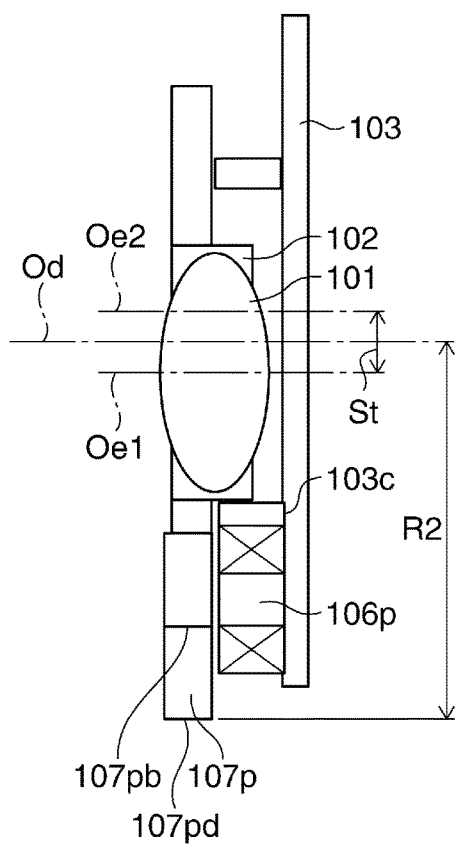

In order to describe a merit in the configuration of the driving device of the embodiment, a comparative example will be described below. FIG. 18A and FIG. 18B are views for describing an image stabilizer of the comparative example that employs one set of a coil and magnet for driving in the pitch direction. FIG. 18A is a sectional view showing a case where a moving part 102 is located at the center of the movable range. Moreover, FIG. 18B is a sectional view showing a case where a magnetization interface 107pb of a first magnet 107p is located at a position just before reaching a coil wire bundle part of a first coil 106p at the side far from an optical element 101 and where the moving part 102 contacts a regulation member 103c so that the further movement is regulated.

In FIG. 18A, an optical axis of the optical element 101 is represented by a symbol Od. In FIG. 18B, an optical axis of the optical element 101 is represented by a symbol Oe1. Then, the optical axis of the optical element 101 that reaches the regulation member 103c at the opposite side is represented by a symbol Oe2. In a case where one set of a coil and magnet is employed, it is necessary to increase the size Lc of the first coil 106p in the short-side direction in order to equalize the movable range to the moving distance St in FIG. 17B. Furthermore, it is necessary to increase the size of the first magnet 107p in the short-side direction in order to maintain an area in which the first coil 106p overlaps the first magnet 107p in the movable range. As a result, although the movable amount is still equal to the moving distance St, the distance R2 from an outside 107pd of the first magnet 107p to the optical axis Od in a case where the moving part reaches an end becomes larger than the distance R1 in FIG. 17B.

Accordingly, the image stabilizer of the embodiment shown in FIG. 17A and FIG. 17B is smaller in the size in the radial direction while keeping the movable amount than the image stabilizer of the comparative example shown in FIG. 18A and FIG. 18B.

Figure 19:
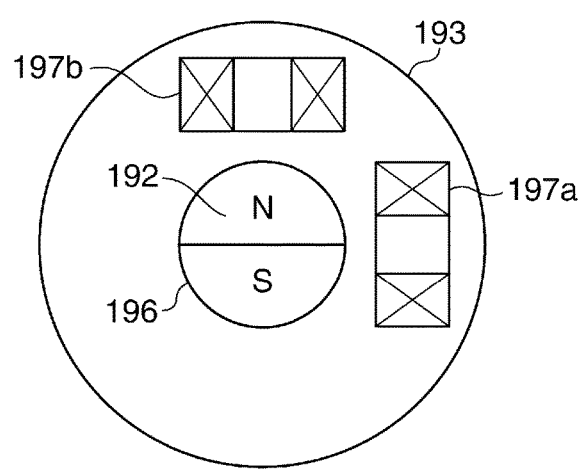
FIG. 19 is a front view showing an example of a configuration of a stepping motor.

FIG. 19 is a front view showing an example of a configuration of a stepping motor.

The illustrated stepping motor 190 has a rotor 192 as a moving part and a stator 193 as a fixing part. Coils 197a and 197b are arranged in the stator 193, and a magnet 196 is arranged in the rotor 192. The rotor 192 is held by the stator 193 through a bearing (not shown) etc.

Figure 20A:
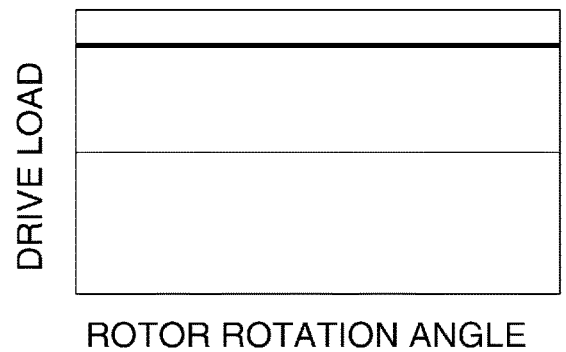
FIG. 20A, FIG. 20B, and FIG. 20C are graphs for describing an operation of the stepping motor shown in FIG. 19.
Figure 20B:
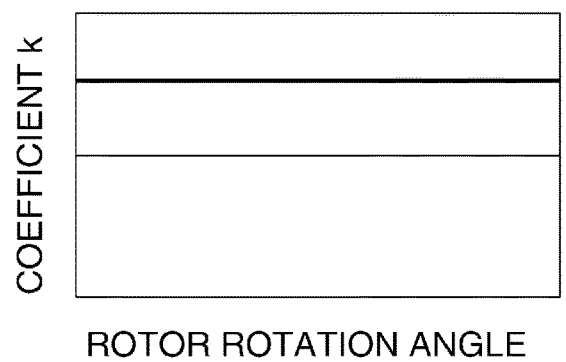
Figure 20C:
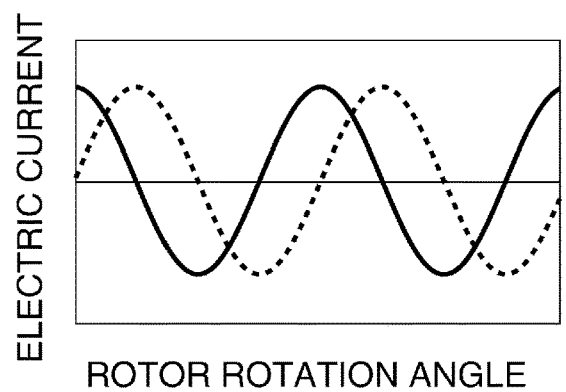

FIG. 20A, FIG. 20B, and FIG. 20C are graphs for describing an operation of the stepping motor shown in FIG. 19. FIG. 20A is a graph showing relation between a rotor rotation angle and drive load, and FIG. 20B is a graph showing relation between the rotor rotation angle and a coefficient. Moreover, FIG. 20C is a graph showing relation between the rotor rotation angle and electric current.

As shown in FIG. 20A, the drive load due to friction by rotation of the rotor 192 etc. becomes almost constant regardless of the rotation angle of the rotor. In this case, when the microstep drive for driving the rotor 192 smoothly is performed, the electric currents shown in FIG. 20C, which are obtained by multiplying a constant coefficient k shown in FIG. 20B to sine waves of which phases are shifted, are supplied to the coils 197a and 197b. When the electric currents are supplied as mentioned above, the rotor 192 is rotated because the drive load is almost constant as shown in FIG. 20A.

Figure 21A:
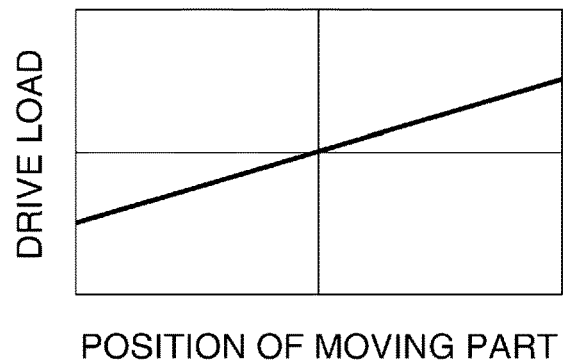
FIG. 21A, FIG. 21B, and FIG. 21C are graphs for describing drive load, a coefficient, and electric currents in response to the movement of the moving part in the image stabilizer shown in FIG. 1.
Figure 21B:
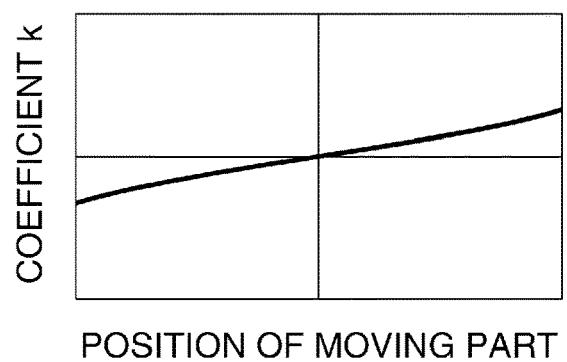
Figure 21C:
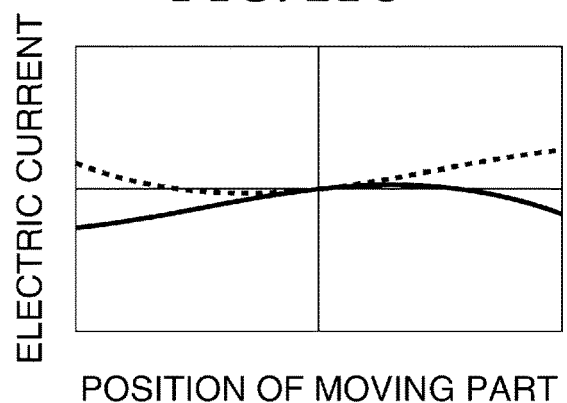

FIG. 21A, FIG. 21B, and FIG. 21C are graphs for describing drive load, a coefficient, and electric currents corresponding to the movement of the moving part in the image stabilizer shown in FIG. 1. FIG. 21A is a graph showing relation between the position of the moving part and the drive load, FIG. 21B is a graph showing relation between the position of the moving part and the coefficient, and FIG. 21C is a graph showing relation between the position of the moving part and the electric currents.

As mentioned above, the moving part 142 is energized by the tension springs 145a, and the moving part 142 receives the spring reaction force that varies according to the position of the moving part 142. Accordingly, the larger the change of the position of the moving part 142 is, the larger the spring reaction force is, which increase the drive load as a result. That is, the drive load varies in response to the position of the moving part 142.

As described with reference to FIG. 16A, when the sine wave is supplied so as to drive the moving part 142 smoothly, the thrust varies smoothly and is approximately a constant value as shown in FIG. 16D. Although the stepping motor uses the whole region of the sine wave, the embodiment uses only a partial region of the sine wave.

Since the drive load varies as shown in FIG. 21A, adjustment of the electric current by multiplying a coefficient that varies in response to the drive load concerned enables to drive the moving part 142. FIG. 21C shows the electric currents after correction by the coefficient k shown in FIG. 21B. In the description, the electric currents are controlled on the basis of the functions that multiply the coefficient that varies in response to the drive load. As a result of this, the thrust corresponding to the drive load shown in FIG. 21A is generated.

Thus, the first embodiment of the present invention suppresses increase of the diameter of the image stabilizer even when the movable amount of the moving part is enlarged.

Next, one example of an image stabilizer according to a second embodiment of the present invention will be described. It should be noted that the configuration of the image stabilizer according to the second embodiment is the same as that of the image stabilizer shown in FIG. 1 except for a part.

Figure 22A:
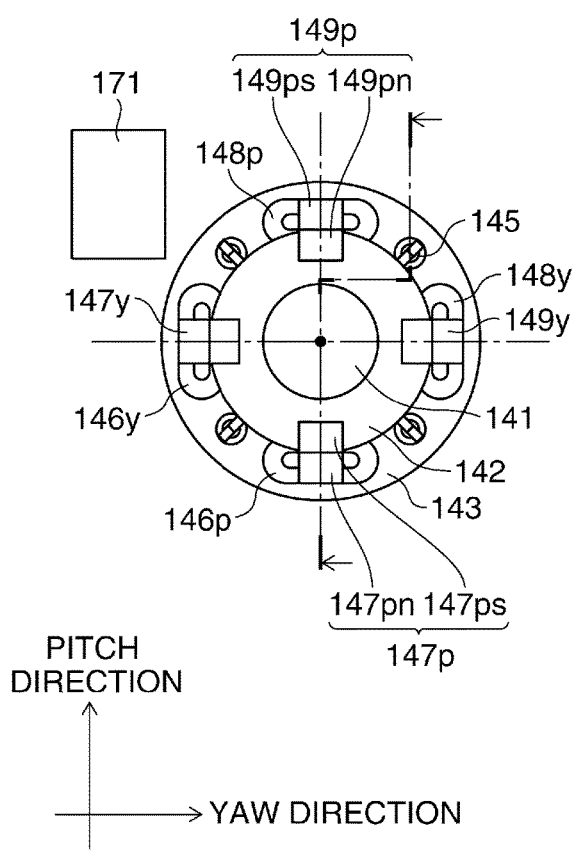
FIG. 22A and FIG. 22B are views showing an example of a configuration of an image stabilizer according to a second embodiment of the present invention.
Figure 22B:
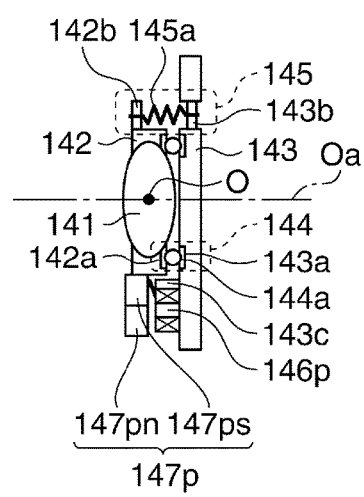

FIG. 22A and FIG. 22B are views showing an example of a configuration of the image stabilizer according to the second embodiment of the present invention, FIG. 22A is a front view and FIG. 22B is a sectional view. It should be noted that components of the image stabilizer in FIG. 22A and FIG. 22B that are the same as the components of the image stabilizer in FIG. 2A and FIG. 2B are indicated by the same reference numbers and the descriptions thereof are omitted.

The image stabilizer of the second embodiment is not provided with the pitch detector (pitch detection element) 151p and the yaw detector (yaw detection element) 151y that are mounted on the image stabilizer 100 shown in FIG. 1. That is, the image stabilizer of the second embodiment is not provided with the detection unit 150, and does not calculate a difference between a target position and detection position. The second embodiment does not perform the control that takes a difference about the coefficient k into consideration that was described with reference to FIG. 15. Accordingly, the second embodiment supplies electric currents corresponding to a target position to coils in consideration of the responsiveness of the image stabilizer.

Since the electric currents supplied to the coils are controlled in response the target position, although followability to the target position is lowered, the detection unit 150 and wiring that connects the detection unit 150 and the board 171 are unnecessary. Accordingly, the image stabilizer of the second embodiment saves space and simplifies the configuration and control.

It should be noted that the image stabilizer of the second embodiment may have the configuration as described with reference to FIG. 5A and FIG. 5B through FIG. 11A and FIG. 11B except for the point where the detection unit 150 is not provided.

Thus, the second embodiment of the present invention is provided with two sets of coils and magnets for each of the pitch and yaw directions as with the first embodiment, which suppresses increase of the diameter of the image stabilizer even when the movable amount of the moving part is enlarged.

Next, one example of an image stabilizer according to a third embodiment of the present invention will be described. It should be noted that the configuration of the image stabilizer of the third embodiment is the same as that of the image stabilizer shown in FIG. 1, FIG. 2A, and FIG. 2B.

Figure 23A:
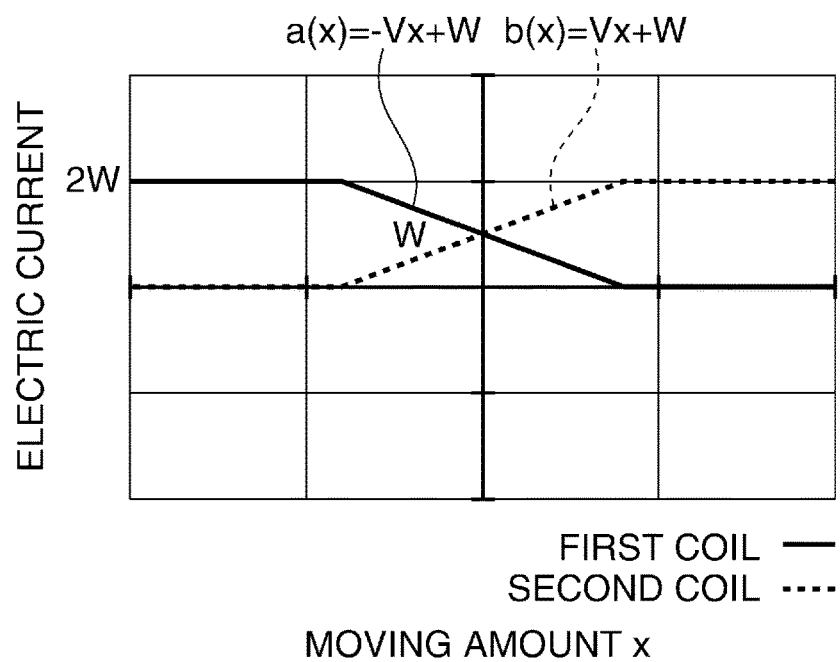
FIG. 23A and FIG. 23B are graphs for describing correction control by an image stabilizer according to a third embodiment of the present invention.
Figure 23B:
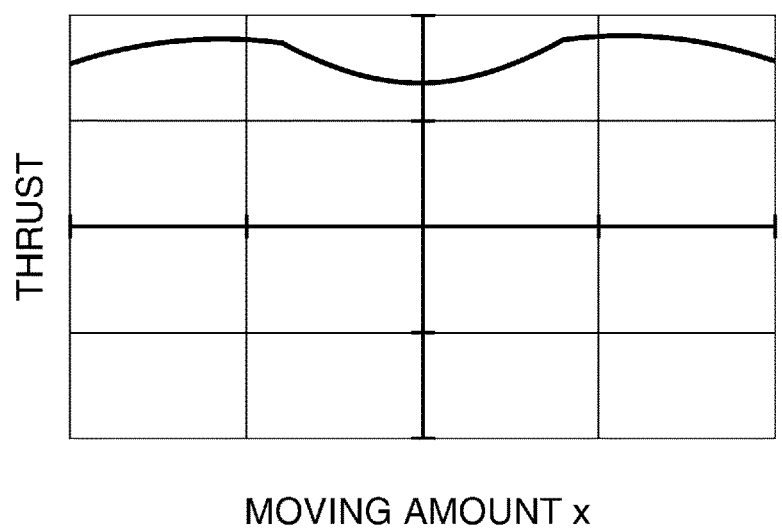

FIG. 23A and FIG. 23B are graphs for describing correction control by the image stabilizer according to the third embodiment of the present invention. FIG. 23A is a graph showing relation between a moving amount of a moving part and electric currents, and FIG. 23B is a graph showing relation between the moving amount of the moving part and a thrust.

A first function $a(x)$ and second function $b(x)$ shown in FIG. 23A are respectively denoted by the following formulas (3) and (4) when the moving part 142 is located near the center of the movable range.

$$a(x) = -V \cdot x + W \quad (3)$$

$$b(x) = +V \cdot x + W \quad (4)$$

Moreover, when the moving part 142 is located near the end at the side of the first actuator 180p in the movable range, the first function $a(x)$ and second function $b(x)$ are respectively denoted by the following formulas (5) and (6).

$$a(x) = 2W \quad (5)$$

$$b(x) = 0 \quad (6)$$

Furthermore, when the moving part 142 is located near the end at the side of the second actuator 181p in the movable range, the first function $a(x)$ and second function $b(x)$ are respectively denoted by the following formulas (7) and (8). Wherein V and W are constants that are settled by design, respectively.

$$a(x) = 0 \quad (7)$$

$$b(x) = 2W \quad (8)$$

The first function $a(x)$ relates to the second function $b(x)$ so that the sum of the functions keeps a constant value (2

W). A value of one function becomes "0" near an end of the movable range, and the values of the functions vary near the center of the movable range.

As shown in FIG. 23B, when the above-mentioned first function and second function are used, the thrust declines in a case where the moving part 142 is located near the center of the movable range. However, since the spring reaction force by the tension springs 145a is small near the center of the movable range, the moving part 1042 is driven even when the thrust is small. Furthermore, since the sum of the first function and a second function is constant, the total of the electric currents supplied to the first coil 146p and second coil 148p is constant.

In addition, since one function becomes "0" near an end of the movable range, generation of the surface external force is suppressed. Although simple functions with polygonal lines are employed as the first function and second function in the description, other functions may be employed as long as the mutual size relation of the functions switches near the center of the movable range and the sum of them is constant. Moreover, the image stabilizer of the third embodiment may have the configuration as described with reference to FIG. 5A and FIG. 5B through FIG. 11A and FIG. 11B. Furthermore, the image stabilizer of the third embodiment may employ the open control as with the second embodiment.

Thus, the third embodiment of the present invention is provided with two sets of coils and magnets for each of the pitch and yaw directions as with the first embodiment, which suppresses increase of the diameter of the image stabilizer even when the movable amount of the moving part is enlarged.

Next, one example of an image stabilizer according to a fourth embodiment of the present invention will be described. It should be noted that the configuration of the image stabilizer according to the fourth embodiment is the same as that of the image stabilizer shown in FIG. 1.

Figure 24A:
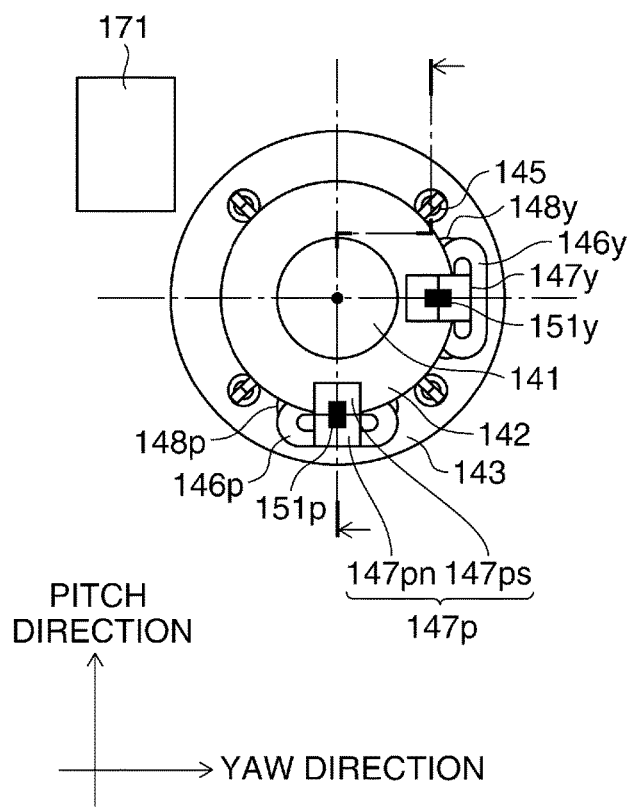
FIG. 24A and FIG. 24B are views showing an example of a configuration of an image stabilizer according to a fourth embodiment of the present invention.
Figure 24B:
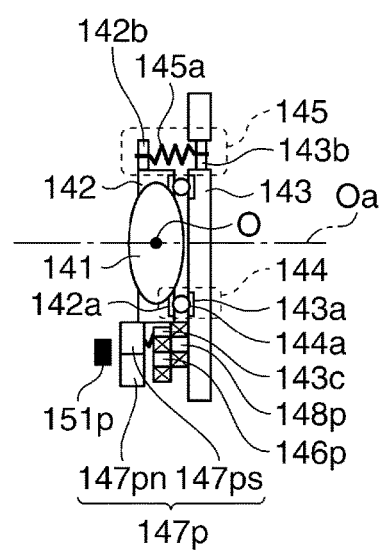

FIG. 24A and FIG. 24B are views showing an example of a configuration of the image stabilizer according to the fourth embodiment of the present invention, FIG. 24A is a front view and FIG. 24B is a sectional view. It should be noted that components of the image stabilizer in FIG. 24A and FIG. 24B that are the same as the components of the image stabilizer in FIG. 2A and FIG. 2B are indicated by the same reference numbers and the descriptions thereof are omitted.

In the fourth embodiment, the two coils 146p and 148p for driving in the pitch direction are provided at one side of the optical element 141, and face the same magnet 147p. Similarly, the two coils 146y and 148y for driving in the yaw direction are provided at one side of the optical element 141, and face the same magnet 147y. That is, the fourth embodiment employs the two magnets and four coils.

As shown in FIG. 24A and FIG. 24B, the second coil 148p is held in the fixing part 143, and the first coil 146p is arranged over the second coil 148p at the side of the magnet 147p so as to be shifted outwardly by the width of winding. That is, the first coil 146p and second coil 148p face the same side of the magnet 147p.

In the same manner, the fourth coil 148y is held in the fixing part 143, and the third coil 146y is arranged over the fourth coil 148y at the side of the magnet 147y so as to be shifted outwardly by the width of winding. That is, the third coil 146y and fourth coil 148p face the same side of the magnet 147y.

Figure 25A:
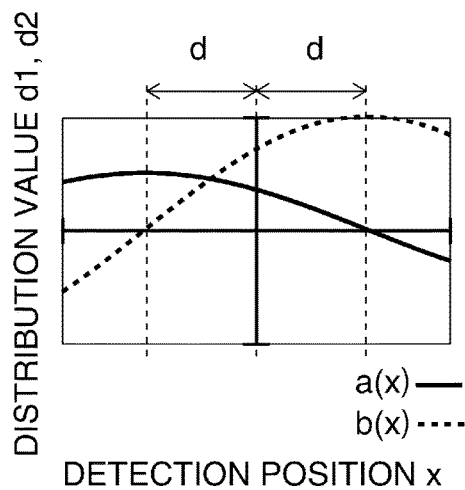
FIG. 25A, FIG. 25B, FIG. 25C, and FIG. 25D are views for describing control of a moving part performed by the image stabilizer according to the fourth embodiment of the present invention.
Figure 25B:
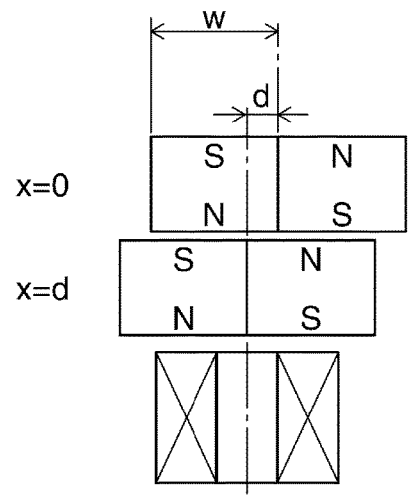
Figure 25C:
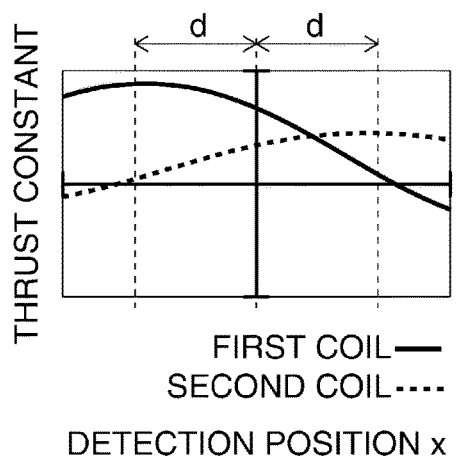

FIG. 25A, FIG. 25B, FIG. 25C, and FIG. 25D are views for describing the control of the moving part performed by the image stabilizer of the fourth embodiment of the present invention. Then, FIG. 25A is a graph showing examples of the first function and second function, and FIG. 25B is a view showing arrangements of the magnet and coil. Moreover, FIG. 25C is a graph showing a thrust constant that is a thrust per unit current. And FIG. 16D is a graph showing an example of a thrust that occurs in the moving part.

As shown in FIG. 25B, a length of each pole in the direction that intersects perpendicularly with the magnetization interface of the magnet is indicated by w, and a deviation amount of the magnet against the coil is indicated by d. In this case, the first function a(x) and the second function b(x) are respectively denoted by the following formulas (9) and (10).

$$a(x) = \sin[\{2\pi(x+d)\}/2w] \quad (9)$$

$$b(x) = m \cdot \sin[\{2\pi(x-d)\}/2w] \quad (10)$$

In the description, a symbol m denotes a coefficient that is larger than 1 and is settled according to the distance between the second coil 148p and magnet 147p. Thus, the first function a(x) does not have a certain relation with the second function b(x).

Since both the first function a(x) and second function b(x) are trigonometric functions, a certain relationship is not held as shown in FIG. 25A in order to drive the moving part 142 smoothly as with the microstep drive for the stepping motor. Furthermore, since the phases of the first function and second function are respectively shifted by the deviation amount d, the first function and second function are maximized at a position where the moving part 142 moves by d. As a result, the electric currents that are supplied to the coils are maximized.

In this position, the magnetization interface of the magnet overlaps with the center of the coil when viewed in the optical axis direction as shown in the case of "x=d" in FIG. 25B. This positional relationship between the magnet and coil maximizes a thrust constant that is a thrust per unit current as shown in FIG. 25C, and generates a thrust most efficiently. Accordingly, when the phases of the first function and second function are respectively shifted by the deviation amount d, one set of the coil and magnet generates the maximum thrust at the most efficient position.

In addition, since the distance between the second coil 148p and magnet 147p is larger than the distance between the first coil 146p and magnet 147p, the magnetic force that acts on the second coil 148p decreases, and the thrust constant becomes small as shown in FIG. 25C. Accordingly, the electric currents are supplied under the condition where the amplitude of the second function b(x) is larger than the amplitude of the first function a(x) so that the thrust by the first coil is equivalent to the thrust by the second coil.

Figure 25D:
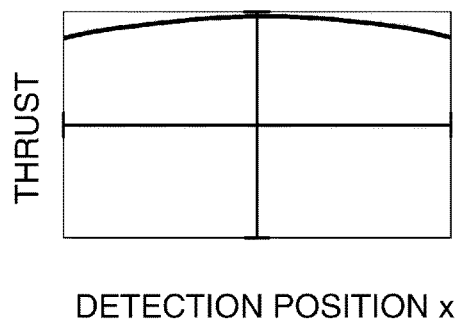

Thus, the first function and second function are defined as the trigonometric functions of which phases are mutually deviated by the deviation amount between the coil and magnet and of which amplitudes are different. As a result of this, the thrust occurs smoothly and efficiently as shown in FIG. 25D.

Although the first function and second function are defined as the trigonometric functions in the illustrated example, other two functions may be employed as long as the mutual size relation of the functions switches near the center of the movable range of the moving part and the functions are applied to the operation of the image stabilizer 100. Moreover, although the amplitude of the second function is m times as large as the amplitude of the first function, the magnification can be changed as long as the changed magnification is sufficient to compensate the insufficiency of the thrust of the second coil 148*p*.

In the fourth embodiment, a moving coil system in which the coils are held by the moving part 142 and the magnets are held by the fixing part 143 may be employed. Moreover, the image stabilizer of the fourth embodiment may have the configuration as described with reference to FIG. 5A and FIG. 5B through FIG. 11A and FIG. 11B. Furthermore, the image stabilizer of the fourth embodiment may employ the open control as with the second embodiment.

Thus, the fourth embodiment of the present invention is provided with two sets of coils and for each of the pitch and yaw directions as with the first embodiment, which suppresses increase of the diameter of the image stabilizer even when the movable amount of the moving part is enlarged.

Next, one example of an image stabilizer according to a fifth embodiment of the present invention will be described. It should be noted that the configuration of the image stabilizer according to the fifth embodiment is the same as that of the image stabilizer shown in FIG. 1.

Figure 26A:
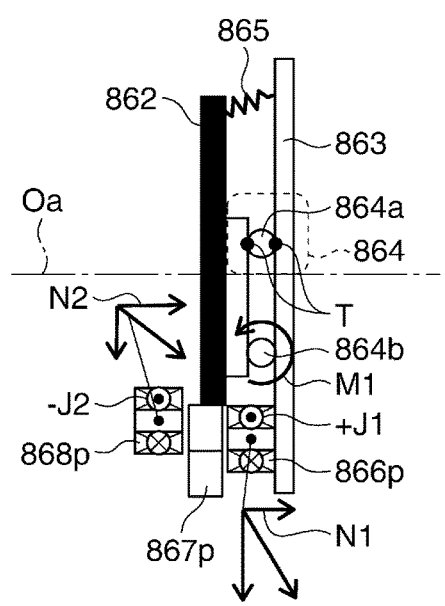
FIG. 26A and FIG. 26B are views for describing an operation of an image stabilizer according to a fifth embodiment of the present invention.
Figure 26B:
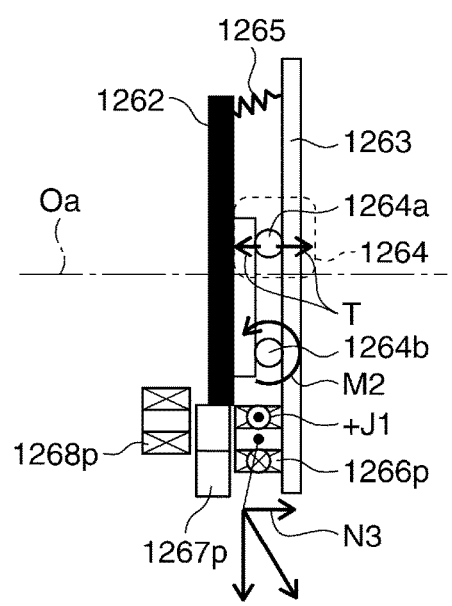

FIG. 26A and FIG. 26B are views for describing an operation of the image stabilizer according to a fifth embodiment of the present invention. Then, FIG. 26A is a sectional view showing a case where a moving part reached an end of a movable range at a side of a first magnet, and FIG. 26B is a sectional view showing another case where the moving part reached the end of the movable range at the side of the first coil.

In FIG. 26A, a moving part 862, a fixing part 863, a support mechanism 864, rolling balls 864*a* and 864*b*, a tension spring 865, a first coil 866*p*, a magnet 867*p*, and a second coil 868*p* are shown in simplified forms.

When the moving part 862 reached an end, a stretch amount of the tension spring 865 that is arranged so as to energize the moving part 862 and fixing part 863 mutually increases, and spring reaction force increases. The component in the moving direction of the spring reaction force is opposite to the thrust that is generated by the coils and magnet. Accordingly, it is necessary to increase the thrust that is generated by the coils and magnet in order to make the moving part 862 reach the target position.

When the electric currents supplied to the coils increase in order to increase the thrust, the surface external force also increases. In the state where the moving part 862 has reached the end, the large surface external forces N1 and N2 occur by the first coil 866*p* and second coil 868*p* due to the increase of the electric currents and the fact that the centers of the coils are distant from the magnetization interface of the magnet. In the description, the directions of the surface external forces N1 and N2 that occur in the first coil 866*p* and second coil 868*p* are identical.

In addition, the rolling ball 864*a* is arranged near the optical axis Oa in order to reduce the diameter of the image stabilizer. When the electric currents are supplied to the first coil 866*p* and second coil 868*p* so as to generate thrusts in the same direction, a large moment M1 around the rolling ball 864*b* occurs in the moving part 862*a* due to the surface external forces N1 and N2. As a result, since the moment M1 detaches the rolling ball 864*a* from the moving part 862 or the fixing part 863 in the support mechanism 864, a contact force T at the side of the moving part or the fixing part becomes "0". In this case, the rolling ball 864*a* may float, which may shift the position of the moving part 862 in the optical axis direction. As mentioned above, the configuration in FIG. 26A is liable to generate a ball float due to the surface external force.

In FIG. 26A, a moving part 1262, a fixing part 1263, a support mechanism 1264, rolling balls 1264*a* and 1264*b*, a tension spring 1265, a first coil 1266*p*, a magnet 1267*p*, and a second coil 1268*p* are shown in simplified forms.

As compared with the configuration in FIG. 26A, the electric current is not supplied to the second coil 1268*p* in FIG. 26B. Since the center of the second coil 1268*p* is apart from the magnetization interface of the magnet 1267*p*, the ratio of the thrust is small and the ratio of the surface external force is large in the force generated by the second coil 1268*p*. Accordingly, when the electric current is not supplied to the second coil 1268*p*, the surface external force is largely reduced while suppressing reduction of the thrust. As a result, the angular moment decreases and the ball float is suppressed.

When the thrust decreases and the moving part 1262 cannot move because the electric current is not supplied to the second coil 1268*p*, the thrust is supplemented by increasing the electric current supplied to the first coil 1266*p*. This enables to drive the moving part 1262 In this case, even if the electric current that is supplied to the first coil 1266*p* increases, the sum of the surface external forces becomes smaller than the case where the electric currents are supplied to both of the first coil 1266*p* and second coil 1268*p*. That is, since the center of the first coil 1266*p* is close to the magnetization interface of the magnet 1267*p*, the ratio of the thrust is large and the ratio of the surface external force is small in the force generated by the first coil 1266*p*, and accordingly the sum of surface external forces becomes small.

Thus, the electric currents that are supplied to the first coil 1266*p* and second coil 1268*p* are set so that the contact forces T act at the sides of the moving part 1262 and fixing part 1263 in the support mechanism 1264.

As a measure against the ball float that is different from the above-mentioned description, the tension spring and rolling ball may be arranged at positions away from the center O of the optical element, for example. However, the configuration concerned increases the diameter of the image stabilizer. Accordingly, when a configuration in which the ball float tends to occur is employed, the measure against the ball float shown in FIG. 26B is preferable because enlargement of the image stabilizer in the radial direction is suppressed.

Figure 27A:
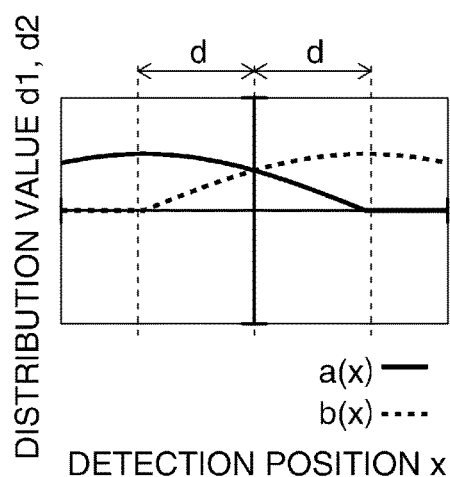
FIG. 27A, FIG. 27B, FIG. 27C, and FIG. 27D are views for describing control of the moving part performed by the image stabilizer according to the fifth embodiment of the present invention.
Figure 27B:
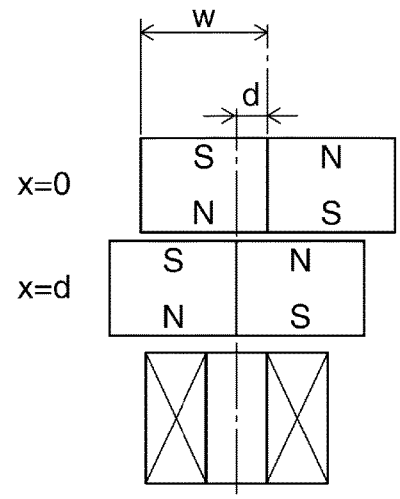
Figure 27C:
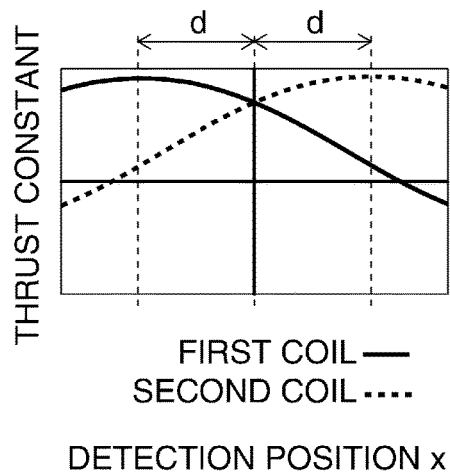
Figure 27D:
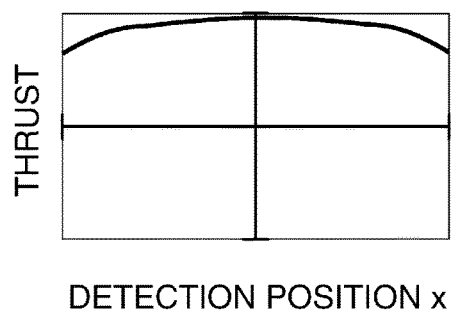

FIG. 27A, FIG. 27B, FIG. 27C, and FIG. 27D are views for describing the control of the moving part performed by the image stabilizer of the fifth embodiment of the present invention. Then, FIG. 27A is a graph showing examples of the first function and second function, and FIG. 27B is a view showing arrangements of the magnet and coil. Moreover, FIG. 27C is a graph showing a thrust constant that is a thrust per unit current. And FIG. 16D is a graph showing an example of a thrust that occurs in the moving part.

As shown in FIG. 27B, a length of each pole in the direction that intersects perpendicularly with the magnetization interface of the magnet is indicated by w, and a deviation amount of the magnet against the coil is indicated by d. In this case, the first function a(x) and the second function b(x) are respectively denoted by the following formulas (11) and (12).

$$a(x) = g \cdot \sin\left[\{2\pi(x+d)\}/2w\right] \quad (11)$$

$$b(x) = h \cdot \sin\left[\{2\pi(x-d)\}/2w\right] \quad (12)$$

In the description, the symbol g denotes a coefficient that becomes "0" when the moving part 1262 is located in a range near the end at the side of the second coil 1268*p* and that becomes "1" when the moving part 1262 is located in the other range. Moreover, the symbol h denotes a coefficient that becomes "1" when the moving part 1262 is located in a range near the end at the side of the first coil 1266*p* and that becomes "1" when the moving part 1262 is located in the other range. Thus, the first function a(x) does not have a certain relation with the second function b(x) as shown in FIG. 27A.

As mentioned above, when the moving part 1262 is located near the end at the side of the first coil 1266*p*, the coefficient g becomes "1" and the coefficient h becomes "0". In this case, the electric current is supplied to the first coil 1266*p*, and the electric current is not supplied to the second coil 1268*p*. Accordingly, generation of the ball float is suppressed as mentioned above.

On the other hand, when the moving part 1262 is located near the end at the side of the second coil 1268*p*, the coefficient g becomes "0" and the coefficient h becomes "1". In this case, the electric current is not supplied to the first coil 1266*p*, and the electric current is supplied to the second coil 1268*p*. Accordingly, generation of the ball float is suppressed similarly.

It should be noted that the coefficients g and h may not be "0" and be less than "1" near the respective ends and may not be "1" and be more than "1" in the respective other ranges.

Although the first function and second function are defined as the trigonometric functions in the illustrated example, other two functions may be employed as long as the mutual size relation of the functions switches near the center of the movable range of the moving part and the functions are applied to the operation of the image stabilizer 100. Moreover, the image stabilizer of the fifth embodiment may have the configuration as described with reference to FIG. 5A and FIG. 5B through FIG. 11A and FIG. 11B. Furthermore, the image stabilizer of the fifth embodiment may employ the open control as with the second embodiment.

Thus, the fifth embodiment of the present invention suppresses increase of the diameter of the image stabilizer even when the movable amount of the moving part is enlarged. Furthermore, the moment that acts to the moving part is suppressed and generation of the ball float is suppressed.

As is clear from the above description, in the example shown in FIG. 1, the drive unit 130 and correction unit 140 function as the drive unit, and the control unit 160 and comparing unit 110 function as the control unit.

Although the embodiments of the present invention have been described, the present invention is not limited to the above-mentioned embodiments, the present invention includes various modifications as long as the concept of the invention is not deviated.

For example, the functions of the above mentioned embodiments may be achieved as a control method that is executed by the driving device. Moreover, the functions of the above mentioned embodiments may be achieved as a control program that is executed by a computer with which the driving device is provided. It should be noted that the control program is recorded into a computer-readable storage medium, for example.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-029933, filed Feb. 19, 2016, which is hereby incorporated by reference herein in its entirety.

What is claimed is:

1. A driving device for driving a moving part that is movably supported by a fixing part in a predetermined direction, the driving device comprising:
    a first actuator and a second actuator each of which is provided with a coil arranged in one of the fixing part and the moving part and a magnet arranged in the other part so as to face the coil, a thrust being given to the moving part so as to drive the moving part in the predetermined direction;
    a memory device that stores a set of instructions; and
    at least one processor that executes the instructions to control an electric current supplied to the coil of the first actuator in response to a result obtained by multiplying a first coefficient that varies in response to the position of the moving part by a first control value obtained from a first function based on the position of the moving part, and to control an electric current supplied to the coil of the second actuator in response to a result obtained by multiplying a second coefficient that varies in response to the position of the moving part by a second control value obtained from a second function that is different from the first function based on the position of the moving part.

2. The driving device according to claim 1, wherein the second coefficient is equal to the first coefficient.

3. The driving device according to claim 1, wherein the first function and the second function are trigonometric functions.

4. The driving device according to claim 1, wherein the first coefficient and the second coefficient vary in response to a difference between a target position of the moving part and a detection position of the moving part.

5. A driving device for driving a moving part that is movably supported by a fixing part in a predetermined direction, the driving device comprising:
a memory device that stores a set of instructions; and
at least one processor that executes the instructions to control driving of the moving part based on a function that varies in response to the position of the moving part, a thrust being given to the moving part so as to drive the moving part in the predetermined direction,
wherein the driving device has a first actuator and a second actuator each of which is provided with a coil arranged in one of the fixing part and the moving part and a magnet arranged in the other part so as to face the coil,
wherein the function includes a first function that is a function of the position of the moving part and a second function that is a function of the position of the moving part and is different from the first function, and
wherein the at least one processor executes the instructions to control the electric current supplied to the first actuator based on a first control value obtained from the first function based on the position of the moving part, and to control the electric current supplied to the second actuator based on a second control value obtained from the second function based on the position of the moving part.

6. The driving device according to claim 5, wherein a coil arranged in one of the fixing part and the moving part and a magnet arranged in the other part so as to face the coil are provided with, and
wherein the at least one processor executes the instructions to control an electric current supplied to the coil based on a control value obtained from the function in response to the position of the moving part.

7. The driving device according to claim 5, wherein the at least one processor executes the instructions to control the electric current supplied to the first actuator in response to a result obtained by multiplying a first coefficient by the first control value, and to control the electric current supplied to the second actuator in response to a result obtained by multiplying a second coefficient by the second control value, and wherein the first coefficient and the second coefficient vary in response to the position of the moving part.

8. The driving device according to claim 7, further comprising:
a support mechanism that supports the moving part with respect to the fixing part and is movable in the predetermined direction; and
an energization mechanism that energizes the support mechanism so that the support mechanism is pinched between the fixing part and the moving part,
wherein a magnetizing direction of the magnet in each of the first actuator and the second actuator is coincident with a direction of a normal line of a magnet surface facing the coil in each of the first actuator and the second actuator, and a magnetization interface of the magnet is parallel to a longitudinal direction of the coil, and the longitudinal direction of the coil in the first actuator is parallel to the longitudinal direction of the coil in the second actuator, and
wherein the magnetization interface of the magnet is deviated from the center of the coil by a predetermined deviation amount when the moving part is located at the center of a movable range of the moving part.

9. The driving device according to claim 8, wherein the first function has a predetermined relation with the second function.

10. The driving device according to claim 5, wherein the first function relates to the second function so that the sum of squares of the first function and the second function becomes constant.

11. The driving device according to claim 9, wherein the first function and the second function are trigonometric functions.

12. The driving device according to claim 7, wherein the first coefficient and the second coefficient vary in response to a difference between a target position of the moving part and a detection position of the moving part.

13. The driving device according to claim 7, further comprising an optical element held by the moving part,
wherein the driving device is an image stabilizer for correcting a blur of an image using the optical element.

14. An image pickup apparatus comprising:
a driving device for driving a moving part that is movably supported by a fixing part in a predetermined direction, the driving device comprising:
a memory device that stores a set of instructions;
at least one processor that executes the instructions to control driving of the moving part based on a function that varies in response to the position of the moving part, a thrust being given to the moving part so as to drive the moving part in the predetermined direction; and
an optical element held by the moving part,
wherein the at least one processor executes the instructions to control driving of the moving part so as to correct a blur of an image formed on an image pickup surface through an optical system,
wherein the driving device has a first actuator and a second actuator each of which is provided with a coil arranged in one of the fixing part and the moving part and a magnet arranged in the other part so as to face the coil,
wherein the function includes a first function that is a function of the position of the moving part and a second function that is a function of the position of the moving part and is different from the first function, and
wherein the at least one processor executes the instructions to control the electric current supplied to the first actuator based on a first control value obtained from the first function based on the position of the moving part, and to control the electric current supplied to the second actuator based on a second control value obtained from the second function based on the position of the moving part.

15. An image pickup apparatus comprising:
a driving device for driving a moving part that is movably supported by a fixing part in a predetermined direction, the driving device comprising:
a first actuator and a second actuator each of which is provided with a coil arranged in one of the fixing part and the moving part and a magnet arranged in the other part so as to face the coil, a thrust being given to the moving part so as to drive the moving part in the predetermined direction;
a memory device that stores a set of instructions;
at least one processor that executes the instructions to control an electric current supplied to the coil of the first actuator in response to a result obtained by multiplying a first coefficient that varies according to the position of the moving part by a first control value obtained from a first function based on the position of the moving part, and by controlling an electric current supplied to the coil of the second actuator in response to a result obtained by multiplying a second coefficient that varies according to the position of the moving part by a second control value obtained from a second function that is different from the first function based on the position of the moving part; and an optical element held by the moving part, wherein the at least one processor executes the instructions to control driving of the moving part so as to correct a blur of an image formed on an image pickup surface through an optical system.

16. A control method for a driving device that drives a moving part that is movably supported by a fixing part in a predetermined direction, the control method comprising:

obtaining a control value from a function that varies according to a position of the moving part in response to a detection position of the moving part; and controlling driving of the moving part based on the control value, wherein the driving device has a first actuator and a second actuator each of which is provided with a coil arranged in one of the fixing part and the moving part and a magnet arranged in the other part so as to face the coil, wherein the function includes a first function that is a function of the position of the moving part and a second function that is a function of the position of the moving part and is different from the first function, and wherein the at least one processor executes the instructions to control the electric current supplied to the first actuator based on a first control value obtained from the first function based on the position of the moving part, and to control the electric current supplied to the second actuator based on a second control value obtained from the second function based on the position of the moving part.

17. A control method for a driving device that drive a moving part that is movably supported by a fixing part in a predetermined direction, and a first actuator and a second actuator each of which is provided with a coil arranged in one of the fixing part and the moving part and a magnet arranged in the other part so as to face the coil, the control method comprising:

obtaining a first result by multiplying a first coefficient that varies in response by the position of the moving part to a first control value obtained from a first function based on the position of the moving part, and obtaining a second result by multiplying a second coefficient that varies in response to the position of the moving part by a second control value obtained from a second function based on the position of the moving part; and controlling an electric current supplied to the coil of the first actuator in response to the first result, and controlling an electric current supplied to the coil of the second actuator in response to the second result.

* * * * *